US008014330B2

(12) United States Patent
Kim et al.

(10) Patent No.: US 8,014,330 B2
(45) Date of Patent: Sep. 6, 2011

(54) APPARATUS AND METHOD FOR SELECTING, RELEASING, AND CHANGING MCBCS CHANNEL OF MOBILE STATION IN BROADBAND WIRELESS ACCESS SYSTEM

(75) Inventors: Ki-Back Kim, Seongnam-si (KR);
Jun-Hwan Oh, Yongin-si (KR);
Sung-Bum Park, Seongnam-si (KR);
Seong-Min Kim, Seoul (KR);
Min-Young Park, Suwon-si (KR);
Kyung-Jin Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 897 days.

(21) Appl. No.: 11/970,224

(22) Filed: Jan. 7, 2008

(65) Prior Publication Data

US 2008/0212509 A1 Sep. 4, 2008

(30) Foreign Application Priority Data

Jan. 5, 2007 (KR) .................. 10-2007-0001421
Jan. 10, 2007 (KR) .................. 10-2007-0003052
Mar. 8, 2007 (KR) .................. 10-2007-0023026

(51) Int. Cl.
*H04H 20/71* (2008.01)
*H04W 4/00* (2009.01)
*H04J 3/26* (2006.01)

(52) U.S. Cl. ......... 370/312; 370/328; 370/432; 370/437
(58) Field of Classification Search .......... 370/310–350, 370/390, 432, 437, 471; 455/466; 709/217–229
See application file for complete search history.

(56) References Cited

U.S. PATENT DOCUMENTS

| 7,536,176 B2* | 5/2009 | Bae et al. ................. 455/414.1 |
| 7,852,794 B2* | 12/2010 | Venkatachalam ............ 370/312 |
| 2006/0030312 A1* | 2/2006 | Han et al. ................. 455/432.1 |
| 2006/0239265 A1* | 10/2006 | Son et al. ................. 370/390 |
| 2007/0189162 A1* | 8/2007 | Song et al. ................. 370/230 |
| 2008/0008176 A1* | 1/2008 | Lim et al. ................. 370/390 |
| 2008/0009283 A1* | 1/2008 | Lim et al. ................. 455/432.3 |
| 2008/0051026 A1* | 2/2008 | Kim et al. ................. 455/3.01 |
| 2008/0165750 A1* | 7/2008 | Kim ................. 370/338 |
| 2009/0238107 A1* | 9/2009 | Li et al. ................. 370/312 |
| 2010/0315985 A1* | 12/2010 | Moon et al. ................. 370/312 |

FOREIGN PATENT DOCUMENTS

| KR | 1020030074016 | 9/2003 |
| KR | 1020060046950 | 5/2006 |
| KR | 1020060112578 | 11/2006 |
| KR | 1020060115282 | 11/2006 |

* cited by examiner

*Primary Examiner* — Tri H Phan
(74) *Attorney, Agent, or Firm* — The Farrell Law Firm, P.C.

(57) ABSTRACT

An apparatus and method for selecting, releasing, and changing a MultiCast and BroadCast Service (MCBCS) of a Mobile Station (MS) in a Broadband Wireless Access (BWA) system are provided. The method includes, upon receiving a request to select a specific channel, transmitting a channel selection request message for selecting the channel; determining whether a DSA request message including a Media Access Control (MAC) layer name tag for the channel is received from an Access Service Network-Gateway (ASN-GW), and, upon receiving the DSA request message, transmitting a DSA response message to the ASN-GW; and receiving a channel selection response message including information indicating a success or failure of the channel selection from an MCBCS server. Accordingly, there is an advantage in that an overall transmission delay is reduced for an MCBCS call process, and a processing capacity can be effectively utilized.

73 Claims, 10 Drawing Sheets

APPARATUS AND METHOD FOR SELECTING, RELEASING, AND CHANGING MCBCS CHANNEL OF MOBILE STATION IN BROADBAND WIRELESS ACCESS SYSTEM

PRIORITY

This application claims priority under 35 U.S.C. §119(a) to a Korean patent application filed in the Korean Intellectual Property Office on Jan. 5, 2007 and assigned Serial No. 2007-1421, a Korean patent application filed in the Korean Intellectual Property Office on Jan. 10, 2007 and assigned Serial No. 2007-3052, and a Korean patent application filed in the Korean Intellectual Property Office on Mar. 8, 2007 and assigned Serial No. 2007-23026, the entire disclosure of which is hereby incorporated by reference.

BACKGROUND OF THE INVENTION

1. Field of the Invention

The present invention relates to a Broadband Wireless Access (BWA) system. More particularly, the present invention relates to an apparatus and method for selecting, releasing, and changing a MultiCast and BroadCast Service (MCBCS) channel of a Mobile Station (MS).

2. Description of the Related Art

In general, voice services have been a primary concern in the development of communication systems, and in addition to the voice services, providing various multimedia services as well as data services is becoming increasingly important when developing the communication systems. However, voice-based communication systems have failed to satisfy user demand due to a relatively small transmission bandwidth and expensive service fees. Moreover, advancing communication technologies and growing demand for Internet services have resulted in an increased need for a communication system capable of effectively providing the Internet services. To cope with such user demand, a Broadband Wireless Access (BWA) system has been introduced to effectively provide broadband Internet services.

In addition to voice services, the BWA system supports various data services with a high or low speed as well as multimedia application services (e.g., high-quality video). The BWA system is a wireless communication system that can access to a Public Switched Telephone Network (PSTN), a Public Switched Data Network (PSDN), an Internet network, an International Mobile Telecommunication (IMT) 2000 network, and an Asynchronous Transfer Mode (ATM) network in a fixed or mobile environment based on a wireless medium using a broadband spectrum (e.g., 2 GHz, 5 GHz, 26 GHz, 60 GHz, etc.). Furthermore, the BWA system can support a channel transmission rate of 2 Mbps or more. According to mobility of a user terminal (i.e., whether it is moving or fixed), a communication environment (i.e., indoor or outdoor), and a channel transmission rate, the BWA may be classified into a broadband wireless subscriber network, a broadband mobile access network, and a high-speed wireless Local Area Network (LAN).

A wireless access method of the BWA system is standardized by international standard organizations. One example of the BWA system is a Worldwide Interoperability for Microwave Access WiMAX system, which is standardized by an Institute of Electrical and Electronics Engineers (IEEE) 802.16 standard group. According to the IEEE 802.16 standard, due to a wide bandwidth, large amounts of data can be transmitted at a short period of time in comparison with the conventional wireless technique for a voice service. In addition, a channel (or resource) can be shared by all users, resulting in the effective use of channel. Moreover, since a Quality of Service (QoS) is ensured, the users can receive different QoSs on the basis of service features.

IEEE 802.16 systems conform to a MultiCast and BroadCast Service (MCBCS, also referred to as MBS depending on standard group's or operator's intention) standard so as to provide multicast and broadcast services to a plurality of Mobile Stations (MSs). In the MCBCS standard, a Multicast and Broadcast Service_Zone (MBS_Zone) represents a zone including one sub-cell or a plurality of sub-cells for transmitting the same broadcast channels at the same time with the same frequency. Each sub-cell uses the same Connection IDentifier (CID) for the same broadcast channel or contents within the MBS_Zone. The sub-cell is a group including one frequency and one sector. In general, a Multicast CID (MCID) has a one-to-one mapping relation with one broadcast channel having a multicast Internet Protocol (IP). A Logical Channel ID (LCID) is mapped in one-to-one manner to a content ID, that is, an ID for identifying a plurality of broadcast contents included in a payload of the same multicast IP. A Base Station (BS) transmits an MBS_Zone ID list through a Downlink Channel Descriptor (DCD) message and broadcasts information indicating whether the BS is able to provide an MCBCS service and indicating a zone where the BS belongs. The MBS_Zone may be constructed of one BS or a plurality of BSs.

Unlike the conventional unicast service, the MCBCS simultaneously transmits the same broadcast contents to a plurality of BSs with the same frequency. Then, an MS combines and uses packets received from the BSs, thereby improving reception throughput. The conventional unicast service has a problem in that, when the MS is located at an edge of a cell, data is not smoothly transmitted and received due to significant interference between cells. However, in the case of MCBCS, even when the MS exists in the cell edge, it is possible to receive, combine, and use the same data from the plurality of BSs because a neighboring BS transmits the same contents at the same synchronized time. This effect is referred to as a macro diversity gain.

The MCBCS service can transmit broadcast contents by multicast or broadcast to all MSs existing within the MBS_Zone that provides a specific broadcast service. With the MCBCS service, not only a downlink unidirectional broadcast service but also an uplink bidirectional connection can be possible according to characteristics of the 802.16 system.

Various capacities for all flows of the MCBCS service are required, for example, 32 Kbps, 64 Kbps, 128 Kbps, 256 Kbps, 384 Kbps, 500 Kbps, 1 Mbps, etc. A capacity less than or equal to 64 Kbps is used when contents (e.g., audio, text message, etc.) are provided through the MCBCS service. Typical video & audio services used in a Digital Multimedia Broadcasting (DMB) require a capacity of 384 Kbps. A low-quality video service requires a capacity of 128 Kbps, and a high-quality video service requires a capacity of 1 Mbps or more. In general, in the case of the MCBCS service, a channel configuration and a transmission rate are different for each MBS_Zone.

Basically, user information is managed by a Subscription Profile Repository (SPR). When a security service is additionally provided, the SPR interacts with the security server to perform user authentication. Currently, there is a standard by which a policy server interacts with the SPR in order to obtain user information or to perform user authentication. However, there is no standard by which the policy server interacts with the security server.

In the current IEEE 802.16 standard, only a physical layer and a Media Access Control (MAC) layer are defined, and there is no method of selecting, releasing, and changing a channel. Therefore, in order to support an integrated service (i.e., MCBCS), a signaling process for dealing with a broadcast channel must be defined.

SUMMARY OF THE INVENTION

An aspect of the present invention is to address at least the above-mentioned problems and/or disadvantages and to provide at least the advantages described below. Accordingly, an aspect of the present invention is to provide an apparatus and method for selecting, releasing, and changing a MultiCast and BroadCast Service (MCBCS) channel of a Mobile Station (MS) in a Broadband Wireless Access (BWA) system.

Another aspect of the present invention is to provide an apparatus and method for selecting, releasing, and changing an MCBCS channel of an MS by performing a Dynamic Service Addition (DSA) process and a Dynamic Service Deletion (DSD) process in a BWA system.

According to an aspect of the present invention, a method of selecting an MCBCS channel by an MS in a BWA system is provided. The method includes, upon receiving a request to select a specific channel, transmitting a channel selection request message for selecting the channel; determining whether a DSA request message including a Media Access Control (MAC) layer name tag for the channel is received from an Access Service Network-Gateway (ASN-GW), and, upon receiving the DSA request message, transmitting a DSA response message to the ASN-GW; and receiving a channel selection response message including information indicating a success or failure of the channel selection from an MCBCS server.

According to another aspect of the present invention, a method of selecting an MCBCS channel of an MS by an ASN-GW in a BWA system is provided. The method includes, upon receiving a DSA trigger request message including a broadcast channel IDentifier (ID) of the MS from a policy server, extracting a MAC layer name tag mapped to the broadcast channel ID from a mapping table; transmitting a DSA request message including the extracted MAC layer name tag to the MS; and upon receiving a DSA response message from the MS, transmitting a DSA trigger response message to the policy server.

According to another aspect of the present invention, a method of selecting an MCBCS channel of an MS by an MCBCS server in a BWA system is provided. The method includes, upon receiving a channel selection request message for selecting a specific channel from the MS, extracting a Multicast and Broadcast Service_Zone (MBS_Zone) ID, which is mapped to a Base Station (BS) ID and a broadcast channel ID included in the selection request message, by searching a mapping table; generating a new channel selection request message including the extracted MBS_Zone ID and transmitting the new channel selection request message to a policy server; and upon receiving a channel selection response message including information indicating a success or failure of the channel selection request from the policy server, transmitting the channel selection response message to the MS.

According to another aspect of the present invention, a method of selecting an MCBCS channel of an MS by a policy server in a BWA system is provided. The method includes, upon receiving a channel selection request message for selecting a specific channel from an MCBCS server, transmitting a DSA trigger request message to an ASN-GW; and upon receiving a DSA trigger response message from the ASN-GW, transmitting a channel selection response message including information indicating a success or failure of the channel selection request to the MCBCS server.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

DETAILED DESCRIPTION OF THE PREFERRED EMBODIMENTS

Preferred embodiments of the present invention will be described below with reference to the accompanying drawings. In the following description, well-known functions or constructions are not described in detail since they would obscure the invention in unnecessary detail.

Hereinafter, an apparatus and method for selecting, releasing, and changing a MultiCast and BroadCast Service (MCBCS) channel of a Mobile Station (MS) in a Broadband Wireless Access (BWA) system of the present invention will be described.

In exemplary embodiments of the present invention, a channel selection request process, a channel selection response process, a channel release request process, a channel release response process, a channel change request process, and a channel change response process are performed in a layer above an Internet Protocol (IP) layer. A Dynamic Service Addition (DSA) process and a Dynamic Service Deletion (DSD) process are performed in a Media Access Control (MAC) layer. Hereinafter, if required, an MS will be referred to as an 'MCBCS client' for the processes performed in the layer above the IP layer or a 'MAC layer unit' for the processes performed in the MAC layer.

In the following descriptions, "Network Entity" (NE) is defined according to functions, and may vary depending on a standard group's or operator's intention. For example, a Base Station (BS) may also be referred to as a Radio Access Station (RAS). In addition, an Access Service Network-Gateway (ASN-GW) may also be referred to as an Access Control Router (ACR)

Entities related to the MCBCS service will now be described. In general, examples of the entities in association with the MCBCS service include a Content Provider (CP), a Service Provider (SP), an Access Provider (AP), and a user.

The CP produces and provides contents to be provided through the MCBCS service. The SP receives the contents from the CP, and then provides the contents to a subscribed user at cost or free of charge. The AP transmits to users a service provided from the SP. The CP, the SP, and the AP may be independent providers. Alternatively, however, one provider may take a role of all providers or more than two providers, and an example thereof is a terrestrial broadcasting service provider in the Republic of Korea.

Figure 1:
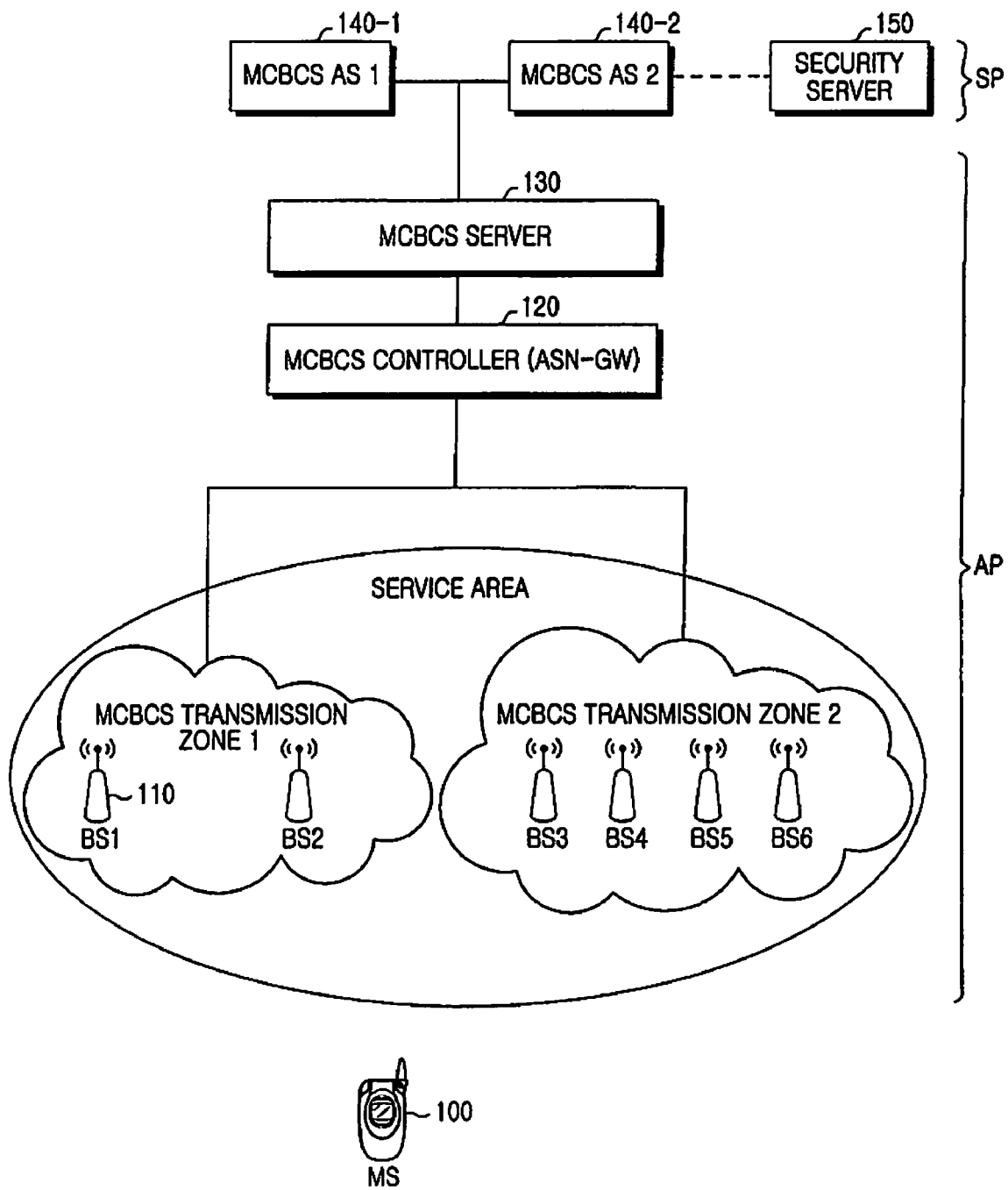
FIG. 1 illustrates a network architecture for providing a MultiCast and BroadCast Service (MCBCS) in a Broadband Wireless Access (BWA) system according to the present invention.

FIG. 1 illustrates a network architecture for providing an MCBCS service in a BWA system according to the present invention.

The network architecture of FIG. 1 includes a security server 150, MCBCS Application Servers (ASs) 140-1 and 140-2, an MCBCS server 130, an MCBCS controller 120, a BS 110, and an MS 100. The MCBCS controller 120 may be an independent unit disposed together with an ASN-GW. Alternatively, the ASN-GW may include functions of the MCBCS controller 120.

Referring to FIG. 1, the security server 150 belongs to a coverage area of the SP, and performs an Authentication, Authorization, and Accounting (AAA) process so that a user can subscribe to the MCBCS service.

The MCBCS ASs 140-1 and 140-2 belong to a coverage area of the AP, and performs a subscription processing/management function for a user who subscribes to the MCBCS service, a function for transmitting MCBCS service contents to the AP, a user authentication function for controlling access of illegal users, a function for protecting contents provided from the CP, a function for managing a plurality of user terminals, and a function for providing information required for the MCBCS service. In FIG. 1, the first MCBCS AS 140-1 and the second MCBCS AS 140-2 are different in that the first MCBCS AS 140-1 is provided for an AP which provides a free service or which does not provide an illegal user control function and a content-protection function, whereas the second MCBCS AS 140-2 is provided for an AP which provides a paid service and also provides the illegal user control function and the content-protection function. The functions of the MCBCS ASs 140-1 and 140-2 will now be described in detail.

Generate MCBCS service information, e.g., a service guide. The service information conforms to data model mutually agreed among MCBCS ASs when the service guide is generated.

Perform a subscription process for receiving an MCBCS service of a user.

Perform user authentication, authorization, and accounting by interacting with the security server 150.

Manage user groups for each MCBCS channel or MCBCS contents.

Manage or distribute authentication keys for each group.

Service protection/content protection: Manage and distribute a content encryption/decryption key.

Stream transmission/file transmission: Define a transport protocol, manage a reception report for determining whether a user correctly receives MCBCS contents, and manage file metadata for file transmission.

User interaction: Provide a user interaction service.

Notification/alert: When a broadcast schedule changes, or when an emergency broadcast is needed, provide a service for reporting this information to a subscriber of the MCBCS service.

The MCBCS server 130 is an entity that takes a key role in the AP. Further, the MCBCS server 130 collects and transmits MCBCS service information (e.g., service guide) from a plurality of SPs, manages network resources for effective usage, and supports errorless reception of data from a user terminal. Details thereof will now be described.

Manage an MCBCS transmission zone: Manage a BS existing in a region where a service is intended to be provided for each SP.

Manipulate a service guide: Aggregate the service guide received from an MCBCS AS, fragment the service guide if necessary, compress the service guide to reduce waste of network resources, and manage maintenance of the service guide.

Distribute the service guide: Use a unicast or multicast method.

Stream transmission/file transmission: Check if a user correctly receives MCBCS contents (optionally, perform the same function as the MCBCS AS).

Manage a multicast group by tracking location of the user.

Process a reception report: When the user reports a network state through the reception report, take the network state into account.

The MCBCS controller 120 is located in the coverage area of the AP. As a connection part between a core network and an access network, the MCBCS controller 120 supports a function for effectively transmitting an MCBCS service transmitted through the core network and a function for reporting the start of the MCBCS service to the user terminal. Details thereof will now be described.

Perform data/time synchronization for providing a macro diversity gain: Allocate burst reservation and manipulate packets.

Manage an MBS_Zone.

Deliver group paging information for notification.

Herein, the MCBCS controller 120 provides a direct interface only with the MCBCS server 130, and an interface with distinctive SPs is possible only through the MCBCS server 130.

The BS 110 wirelessly transmits the MCBCS service, which is transmitted by a wired connection. Further, the BS 110 is managed by the AP.

As a user terminal, the MS 100 provides the MCBCS service transmitted through the network entities to the user.

Although not shown, a policy server manages QoS profile information for all IP flows of an MS that requests a service.

A service area of FIG. 1 represents an area in which the SP provides a service. The MCBCS transmission zone is a transmission management area, which is defined by the AP for the purpose of effective transmission of the MCBCS service in the service area, and also is an area to which the same contents are broadcast. However, the MBS_Zone represents an area in which an MCBCS service flow is available by using distinctive Connection IDentifiers (CIDs) or distinctive Security Associations (SAs).

Figure 2:
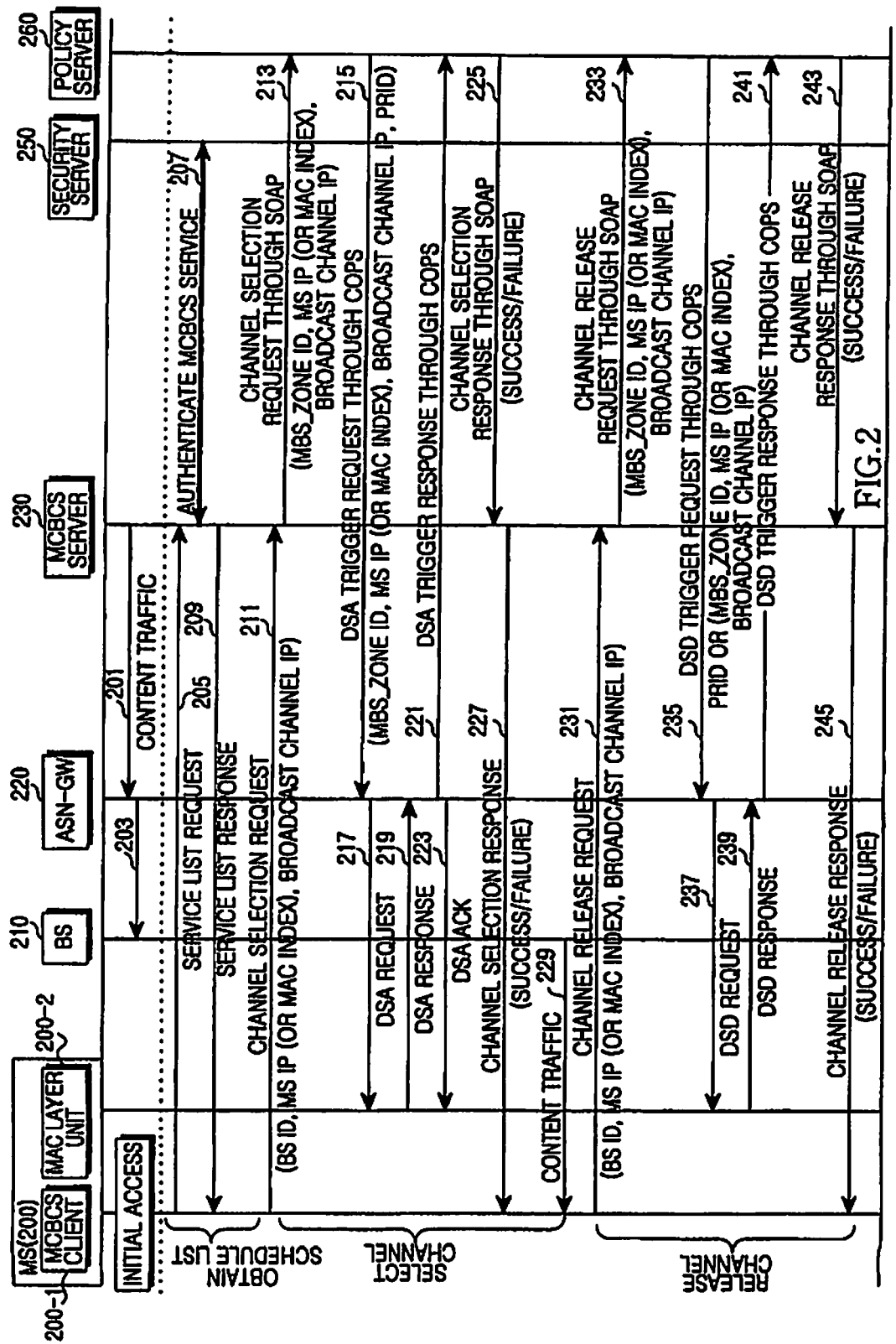
FIG. 2 is a diagram illustrating an overall process of selecting and releasing an MCBCS channel of a Mobile Station (MS) in a BWA system according to the present invention.

FIG. 2 is diagram illustrating an overall process of selecting and releasing an MCBCS channel of an MS in a BWA system according to the present invention.

Referring to FIG. 2, an MCBCS server 230 transmits MCBCS content traffic to an ASN-GW 220 in step 201. Then, the ASN-GW 220 transmits the received MCBCS content traffic to a BS 210 in step 203.

In order to obtain an MCBCS broadcast schedule list, an MCBCS client 200-1 of an MS 200, which has performed initial access, transmits a service list request message including a user profile to the MCBCS server 230, in step 205. In step 207, the MCBCS server 230 interacts with a security server 250 to perform an MCBCS service authentication process on a specific user by using the user profile information. In step 209, the ASN-GW 220 transmits a service list response message including the MCBCS broadcast schedule list to the MCBCS client 200-1.

In step 211, the MCBCS client 200-1 transmits a channel selection request message to the MCBCS server 230 in order to obtain a specific user selected by using the schedule list. The channel selection request message includes a BS ID, an MS IP (or MAC index), and a broadcast channel IP. The MCBCS server 230 extracts an MBS_Zone ID, which is mapped to the BS ID and the broadcast channel IP, from a mapping table. In step 213, the MCBCS server 230 generates a new channel selection request message including the extracted MBS_Zone ID, and transmits the new channel selection request message to a policy server 260 through a Simple Object Access Protocol (SOAP). The new channel selection request message includes the extracted MBS_Zone ID, the MS IP (or MAC index), and the broadcast channel IP.

In step 215, the policy server 260 transmits a DSA trigger request message to the ASN-GW 220 through a Common Open Policy Service (COPS) interface. The DSA trigger request message includes the MBS_Zone ID, the MS IP (or MAC index), the broadcast channel IP, and a PRovisioning instance IDentifier (PRID). The PRID is a value for identifying a policy class instance. One PRID corresponds to one service flow for each ASN-GW.

Thereafter, the ASN-GW 220 extracts a Multicast Connection ID (MCID) mapped to the broadcast channel IP from the mapping table. In step 217, the ASN-GW 220 transmits a DSA request message including the extracted MCID to a MAC layer unit 200-2. The DSA request message includes information, which indicates that a service requested to be added is an MCBCS service flow, and also includes the MBS_Zone ID and the extracted MCID. In step 219, the MAC layer unit 200-2 transmits a DSA response message including a confirmation code to the ASN-GW 220.

In step 221, the ASN-GW 220 transmits a DSA trigger response message including a confirmation code to the policy server 260 through the COPS interface. In step 223, the ASN-GW 220 transmits a DSA Acknowledge (Ack) message including a confirmation code to the MAC layer unit 200-2. In this case, the ASN-GW 220 determines whether the DSA process is successfully performed. If the DSA process has failed, the ASN-GW 220 transmits a re-connection request message or a system error alert message to the MAC layer unit 200-2, and thus the MAC layer unit 200-2 can re-select a channel. The DSA process may be determined a failure when the DSA response message is not received, when a confirmation code for Negative-acknowledgement (Nack) is not included in the DSA response message, or when the generation of the DSA message fails.

In step 225, the policy server 260 transmits a channel selection response message including information indicating a success or failure of the channel selection request to the MCBCS server 230 through the SOAP interface. In step 227, the MCBCS server 230 transmits the channel selection response message to the MCBCS client 200-1. In step 229, the BS 210 transmits the MCBCS content traffic to the MCBCS client 200-1.

In step 231, the MCBCS client 200-1 transmits a channel release request message to the MCBCS server 230 in order to release the channel. The channel release request message includes the BS ID, the MS IP (or MAC index), and the broadcast channel IP. The MCBCS server 230 extracts the MBS_Zone ID, which is mapped to the BS ID and the broadcast channel IP, from the mapping table. In step 233, the MCBCS client 200-1 generates a new channel release request message including the extracted MBS_Zone ID, and then transmits the new channel release request message to the policy server 260 through the SOAP interface. The new channel release request message includes the MBS_Zone ID, the MS IP (MAC index), and the broadcast channel IP.

In step 235, the policy server 260 transmits a DSD trigger request message to the ASN-GW 220 through the COPS interface. The policy server 260 has a unique PRID for each ASN-GW with respect to a service flow that has undergone the DSA process. The DSD trigger request message may include only the PRID. Alternatively, instead of the PRID, the DSD trigger request message may include the MBS_Zone ID, the MS IP, and the broadcast channel IP.

In step 237, the ASN-GW 220 transmits a DSD request message including a confirmation code to the MAC layer unit 200-2. In step 239, the MAC layer unit 200-2 transmits a DSD response message including a confirmation code to the ASN-GW 220. Upon receiving the DSD response message, the ASN-GW 220 transmits a DSD trigger response message including a confirmation code to the policy server 260 through the COPS interface in step 241. The ASN-GW 220 determines whether the DSD process has been successfully performed. If the DSD process has failed, the ASN-GW 220 transmits to the MAC layer unit 200-2 a message indicating failure of the DSD process so as to allow the MAC layer unit 200-2 to decide to re-try the DSD process or to give up channel modification. Alternatively, a system itself may attempt to re-try the DSD process or perform a roll-back. The DSD process may be determined a failure when the DSD response message is not received, when a confirmation code for Nack is not included in the DSD response message, or when the generation of the DSD message has failed.

In step 243, the policy server 260 transmits a channel release response message to the MCBCS server 230 through the SOAP interface. The channel release message includes information indicting success or failure of the channel release request. In step 245, the MCBCS server 230 transmits the received channel release response message to the MCBCS client 200-1.

Figure 3:
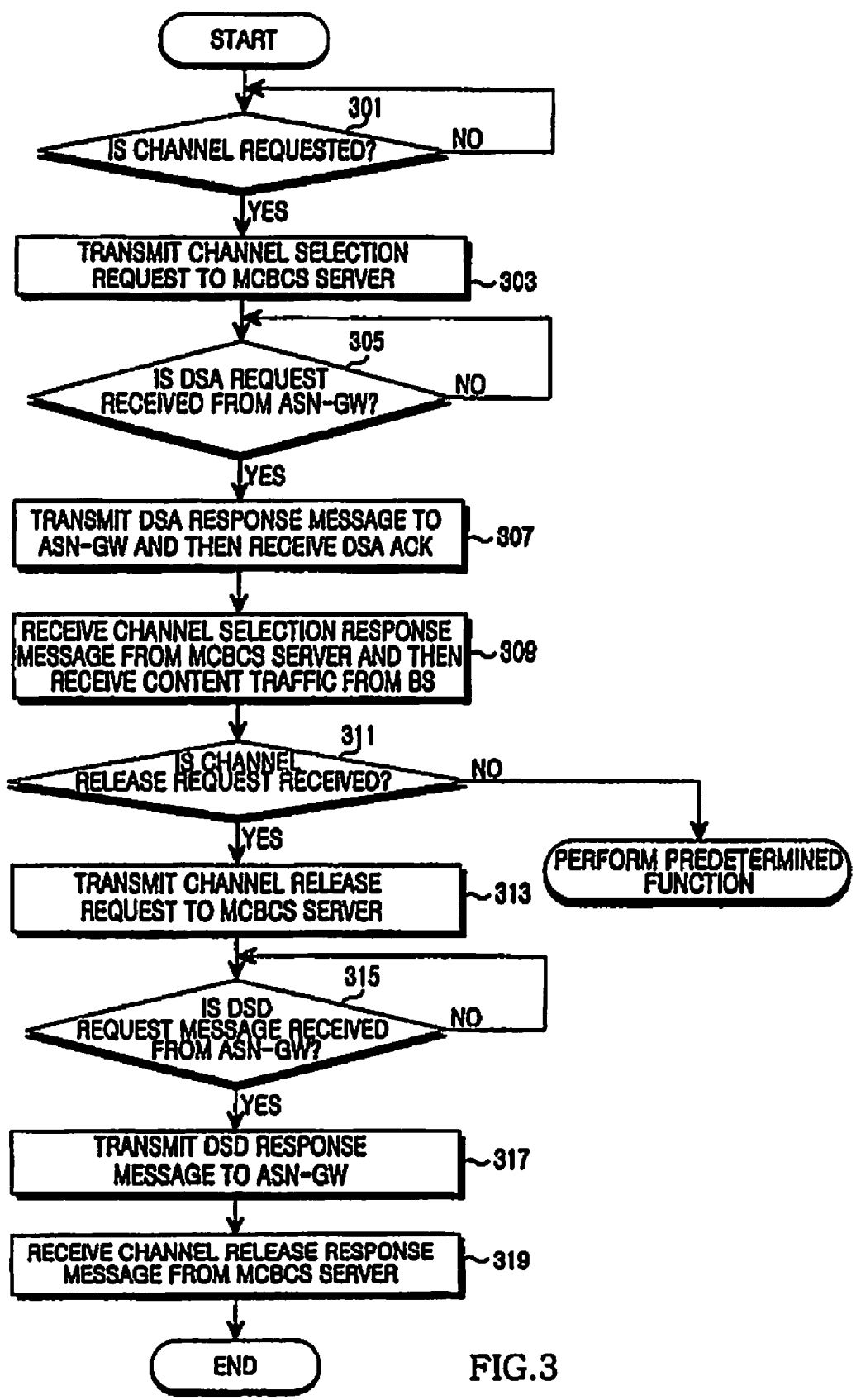
FIG. 3 is a flowchart illustrating a method of selecting and releasing an MCBCS channel by an MS in a BWA system according to the present invention.

FIG. 3 is a flowchart illustrating a method of selecting and releasing an MCBCS channel by an MS in a BWA system according to the present invention.

Referring to FIG. 3, the MS 200 determines whether there is a request for selecting a specific channel by key manipulation of a user in step 301. The user of the MS 200 may request to select the specific channel by using an MCBCS broadcast schedule list received from the MCBCS server 230 Upon detecting the request for selecting the channel, the MS 200 transmits a channel selection request message to the MCBCS server 230 in step 303. The channel selection request message includes a BS ID, an MS IP (or MAC index), and a broadcast channel IP.

In step 305, the MS 200 determines whether a DSA request message including an MCID for the channel is received from the ASN-GW 220. The DSA request message information, which indicates that a service requested to be added is an MCBCS service flow, and also includes an MBS_Zone ID and the MCID mapped to the broadcast channel IP. Upon receiving the DSA request message, the MS 200 transmits a DSA response message including a confirmation code to the ASN-GW 220, and receives a DSA Ack message including a confirmation code from the ASN-GW 220 in step 307. In step 309, the MS 200 receives from the MCBCS server 230 a channel selection response message including information indicating a success or failure of the channel selection request, and then receives MCBCS content traffic from the BS 210.

In step 311, the MS 200 determines whether there is a request for releasing the channel by key manipulation of the user. If the request for releasing the channel is not detected, the MS 200 performs a predetermined function. However, if the request for releasing the channel is detected, the MS 200 transmits a channel release request message to the MCBCS server 230 in order to release the channel. The channel release request message includes the BS ID, the MS IP (or MAC index), and the broadcast channel IP.

In step 315, the MS 200 determines whether a DSD request message including a confirmation code is received from the ASN-GW 220. Upon receiving the DSD request message, the MS 200 transmits a DSD response message including a confirmation code to the ASN-GW 220 in step 317. In step 319, the MS 200 receives a channel release response message including information indicating a success or failure of the channel release request from the MCBCS server 230. Then, the procedure of FIG. 3 ends.

Figure 4:
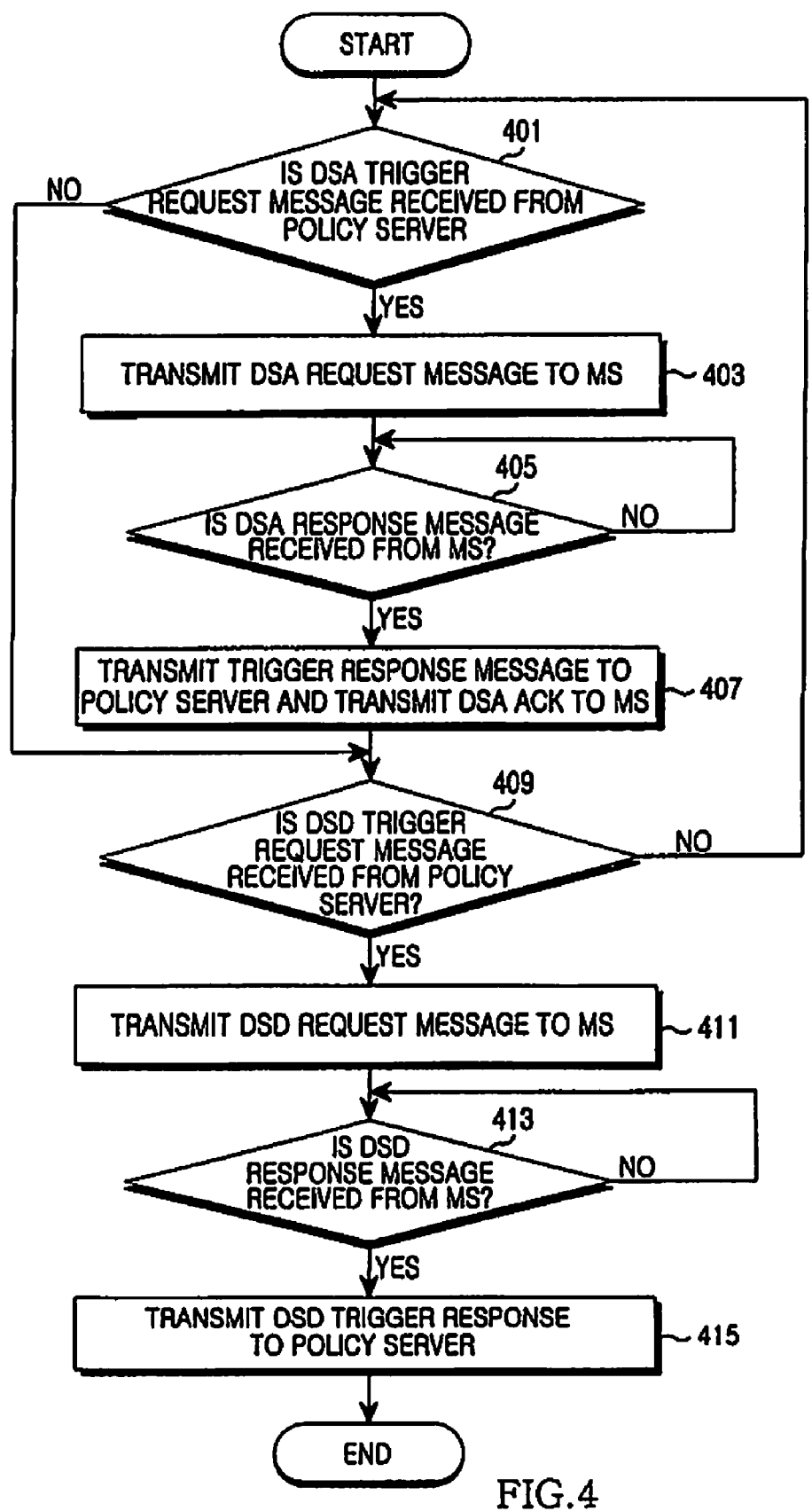
FIG. 4 is a flowchart illustrating a method of selecting and releasing an MCBCS channel of an MS by an Access Service Network-Gateway (ASN-GW) in a BWA system according to the present invention.

FIG. 4 is a flowchart illustrating a method of selecting and releasing an MCBCS channel of an MS by an ASN-GW in a BWA system according to the present invention.

Referring to FIG. 4, the ASN-GW 220 determines whether a DSA trigger request message including a broadcast channel IP of the MS 200 is received from the policy server 260 through the COPS interface in step 401. The DSA trigger request message includes an MBS_Zone ID, an MS IP (or MAC index), a broadcast channel IP, and a PRID. If the DSA trigger request message is not received, proceeding to step 409, the ASN-GW 220 determines whether a DSD trigger request message is received from the policy server 260 through the COPS interface.

Otherwise, if the DSA trigger request message is received, the ASN-GW 220 extracts an MCID mapped to the broadcast channel IP from a mapping table. Then, the ASN-GW 220 transmits a DSA request message including the extracted MCID to the MS 200 in step 403. The DSA request message includes information, which indicates that a service requested to be added is an MCBCS service flow, and also includes the MBS_Zone ID and the extracted MCID.

In step 405, the ASN-GW 220 determines whether a DSA response message including a confirmation code is received from the MS 200. Upon receiving the DSA response message, the ASN-GW 220 transmits a DSA trigger response message including a confirmation code to the policy server 260 through the COPS interface, and also transmits a DSA Ack message including a confirmation code to the MS 200 in step 407.

In step 409, the ASN-GW 220 determines whether a DSD trigger request message is received from the policy server 260 through the COPS interface. The DSD trigger request message includes the PRID of the ASN-GW 220. Alternatively, instead of the PRID, the DSD trigger request message may include the MBS_Zone ID, the MS IP (or MAC index), and the broadcast channel IP. If the DSD trigger request message is not received, returning back to step 401, the ASN-GW 220 determines whether the DSA trigger request message is received from the policy server 260 through the COPS interface.

Otherwise, if the DSD trigger request message is received, the ASN-GW 220 transmits a DSD request message including a confirmation code to the MS 200 in step 411. In step 413, the ASN-GW 220 determines whether a DSD response message including a confirmation code is received from the MS 200. Upon receiving the DSD response message from the MS 200, the ASN-GW 220 transmits a DSD trigger response message including a confirmation code to the policy server 260 through the COPS interface in step 415. Then, the procedure of FIG. 4 ends.

Figure 5:
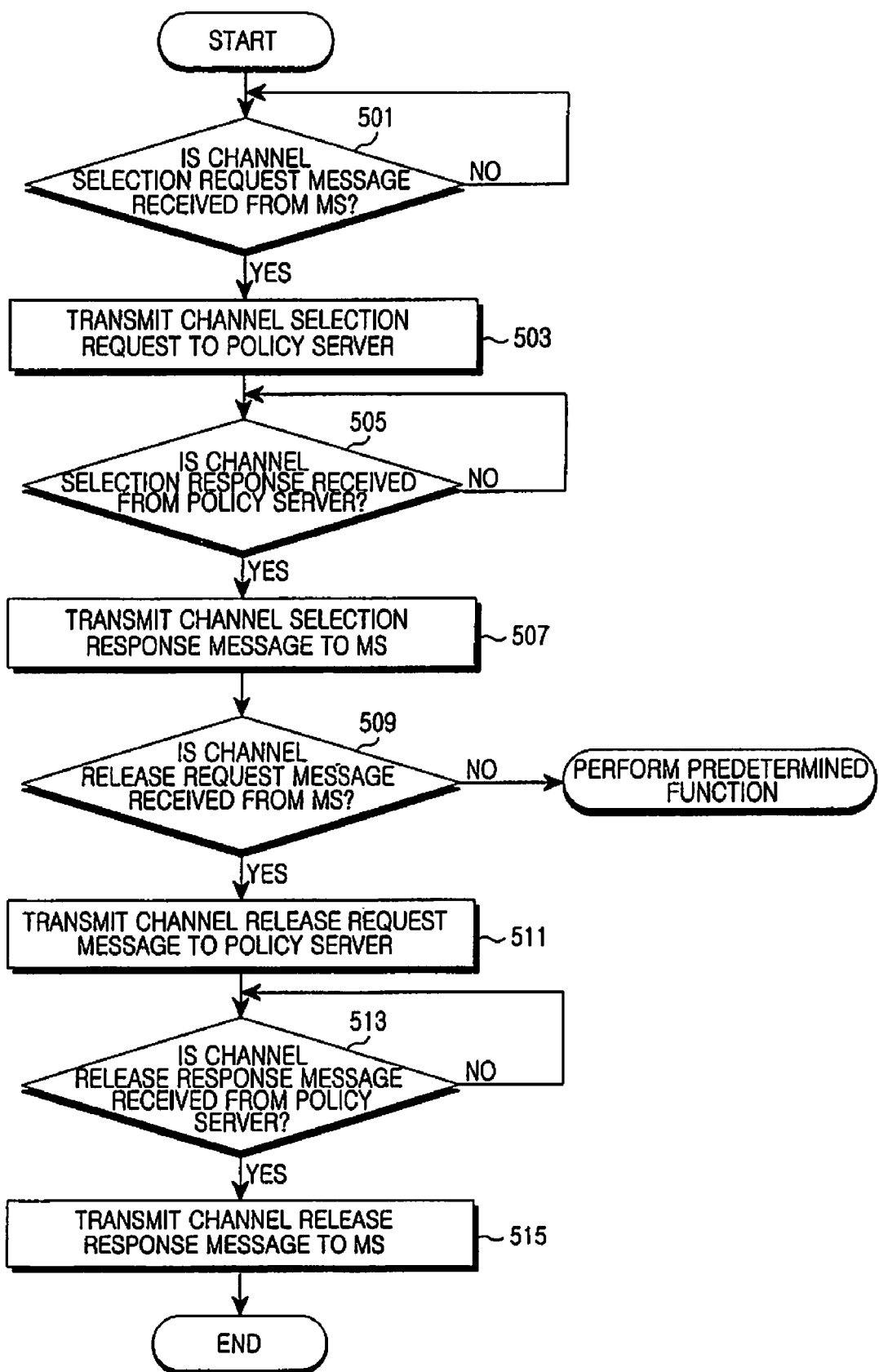
FIG. 5 is a flowchart illustrating a method of selecting and releasing an MCBCS channel of an MS by an MCBCS server in a BWA system according to the present invention.

FIG. 5 is a flowchart illustrating a method of selecting and releasing an MCBCS channel of an MS by an MCBCS server in a BWA system according to the present invention.

Referring to FIG. 5, the MCBCS server 230 determines whether a channel selection request message for selecting a specific channel is received from the MS 200 in step 501. The channel selection request message includes a BS ID, an MS IP (or MAC index), and a broadcast channel IP.

Upon receiving the channel selection request message, the MCBCS server 230 extracts an MBS_Zone ID, which is mapped to the BS ID and the broadcast channel IP, from a mapping table. In step 503, the MCBCS server 230 generates a new channel selection request message including the extracted MBS_Zone ID, and then transmits the new channel selection request message to the policy server 260 through the SOAP interface. The new channel selection request message includes the extracted MBS_Zone ID, the MS IP, and the broadcast channel IP.

In step 505, the MCBCS server 230 determines whether a channel selection response message including information indicating a success or failure of the channel selection request is received from the policy server 260 through the SOAP interface. Upon receiving the channel selection request message, the MCBCS server 230 transmits a channel selection response message to the MS 200 in step 507.

In step 509, the MCBCS server 230 determines whether a channel release request message for releasing the channel is received from the MS 200. The channel release request message includes the BS ID, the MS IP (or MAC index), and the broadcast channel IP. If the channel release request message is not received, the MCBCS server 230 performs a predetermined function. Otherwise, if the channel release message is received, the MCBCS server 230 extracts the MBS_Zone ID, which is mapped to the BS ID and the broadcast channel IP, from the mapping table. In step 511, the MCBCS server 230 generates a new channel release request message including the extracted MBS_Zone ID, and then transmits the new channel release request message to the policy server 260 through the SOAP interface. The new channel release request message includes the MBS_Zone ID, the MS IP (or MAC index), and the broadcast channel IP.

In step 513, the MCBCS server 230 determines whether a channel release response message including information indicating a success or failure of the channel release request is received from the policy server 260 through the SOAP interface. Upon receiving the channel release response message, the MCBCS server 230 transmits the received channel release response message to the MS 200 in step 515. Then, the procedure of FIG. 5 ends.

Figure 6:
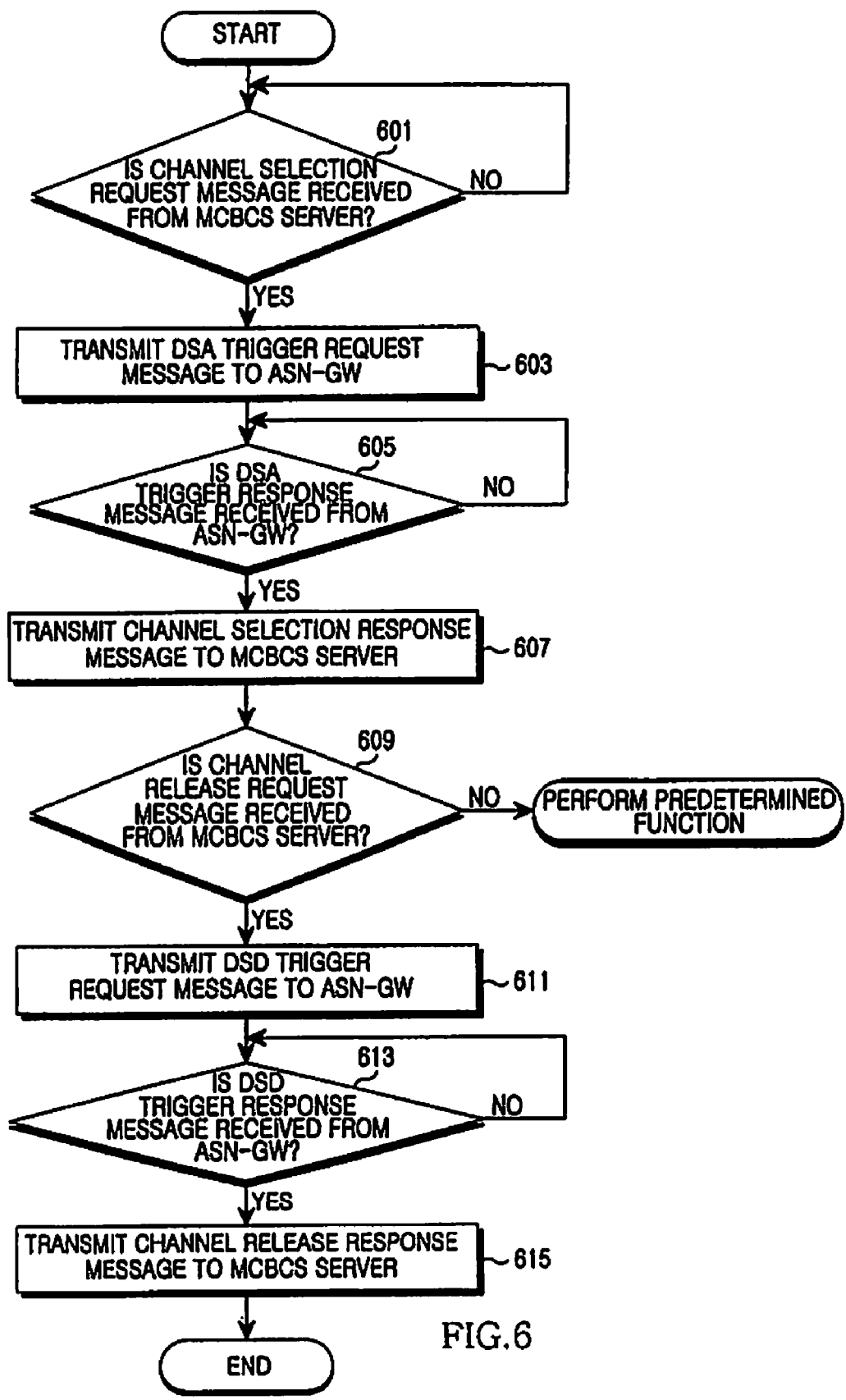
FIG. 6 is a flowchart illustrating a method of selecting and releasing an MCBCS channel of an MS by a policy server in a BWA system according to the present invention.

FIG. 6 is a flowchart illustrating a method of selecting and releasing an MCBCS channel of an MS by a policy server in a BWA system according to the present invention.

Referring to FIG. 6, the policy server 260 determines whether a channel selection request message for selecting a specific channel is received from the MCBCS server 230 through the SOAP interface in step 601. The channel selection request message includes an MBS_Zone ID, an MS IP (or MAC index), and a broadcast channel IP. Upon receiving the channel selection request message, the policy server 260 transmits a DSA trigger request message to the ASN-GW 220 through the COPS interface in step 603. The DSA trigger request message includes the MBS_Zone ID, the MS IP (or MAC index), the broadcast channel IP, and a PRID of the ASN-GW 220.

In step 605, the policy server 260 determines whether a DSA trigger response message including a confirmation code is received from the ASN-GW 220 through the COPS interface. Upon receiving the DSA trigger response message, the policy server 260 transmits a channel selection response message including information indicating a success or failure of the channel selection request to the MCBCS server 230 through the SOAP interface in step 607.

In step 609, the policy server 260 determines whether a channel release request message is received from the MCBCS server 230 through the SOAP interface. The channel release request message includes the MBS_Zone ID, the MS IP (or MAC index), and the broadcast channel IP. If the channel release request message is not received, the policy server 260 performs a predetermined function. Otherwise, if the channel release request message is received, the policy server 260 transmits a DSD trigger request message to the ASN-GW 220 through the COPS interface in step 611. The DSD trigger request message includes the PRID of the ASN-GW 220. Alternatively, instead of the PRID, the DSD trigger request message may include the MBS_Zone ID, the MS IP (or MAC index), and the broadcast channel IP.

In step 613, the policy server 260 determines whether a DSD trigger response message including a confirmation code is received from the ASN-GW 220 through the COPS interface. Upon receiving the DSD trigger response message, the policy server 260 transmits a channel release response message including information indicating a success or failure of the channel release request to the MCBCS server 230 through the SOAP interface in step 615. Then, the procedure of FIG. 6 ends.

Figure 7:
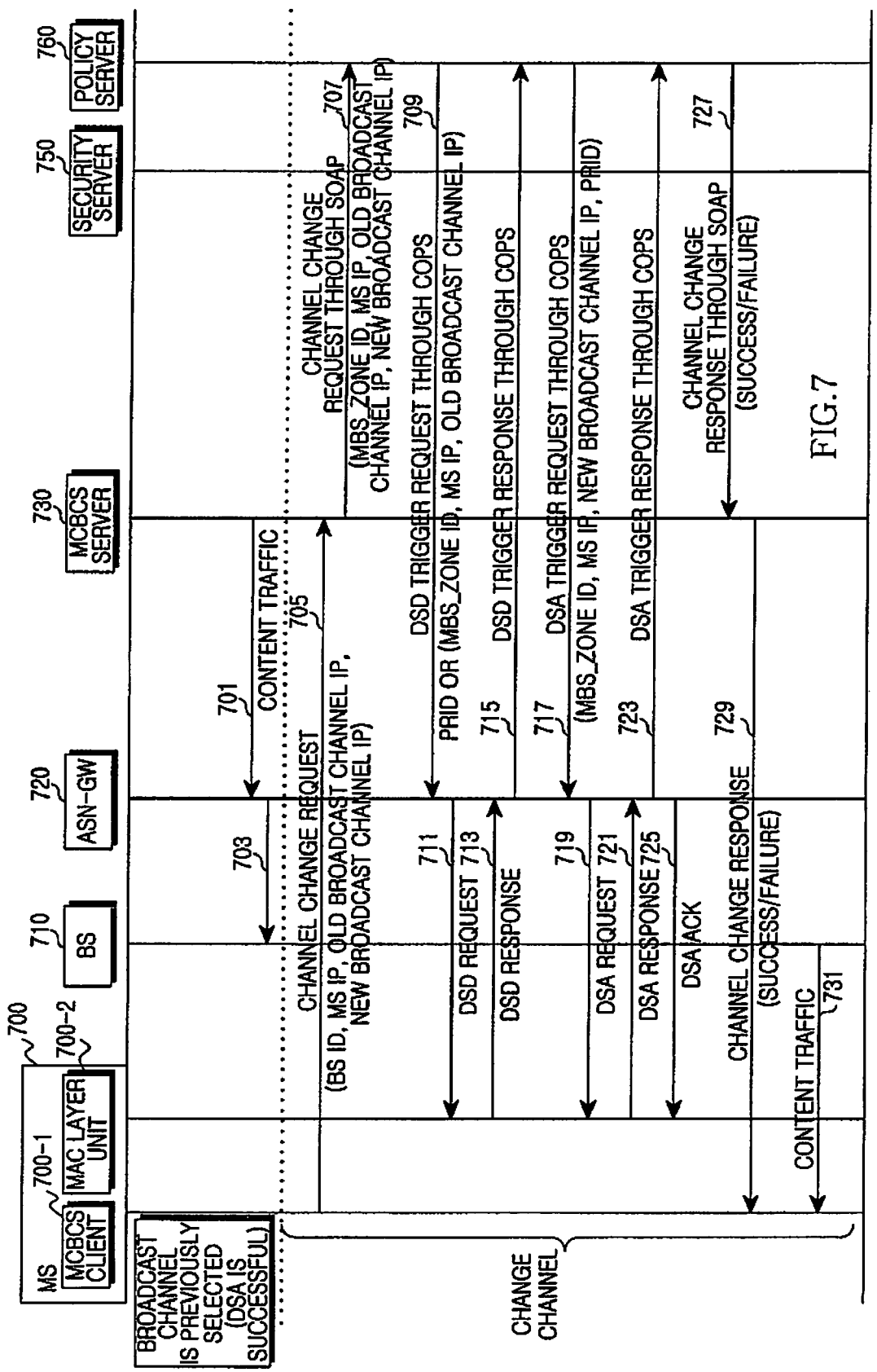
FIG. 7 is a diagram illustrating an overall process of changing an MCBCS channel of an MS in a BWA system according to the present invention.

FIG. 7 is a diagram illustrating an overall process of changing an MCBCS channel of an MS in a BWA system according to the present invention.

Referring to FIG. 7, an MCBCS server 730 transmits MCBCS content traffic to an ASN-GW 720 in step 701. The ASN-GW 720 transmits the received MCBCS content traffic to a BS 710 in step 703. It will be assumed herein that a DSA process has already been successfully performed, and a broadcast channel is already requested.

In step 705, an MCBCS client 700-1 of an MS 700 transmits a channel change request message to the MCBCS server 730 so that an old channel changes to a new channel by key manipulation of an existing user. The channel change request message includes a BS ID, an MS IP (or MAC index), an old broadcast channel IP, and a new broadcast channel IP. In the case of using a service (e.g., adult site) that requires authentication whenever a channel is connected, the MCBCS server 730 may interact with a security server 750 to perform an MCBCS service authentication process after receiving the channel change request message.

When the channel change request message is received, the MCBCS server 730 extracts an MBS_Zone ID, which is mapped to the BS ID and the old broadcast channel IP, from a mapping table. In step 707, the MCBCS server 730 generates a new channel change request message including the extracted MBS_Zone ID, and then transmits the new channel change request message to a policy server 760 through the SOAP interface. The new channel change request message includes the extracted MBS_Zone ID, the MS IP (or MAC index), the old broadcast channel IP, and the new broadcast channel IP.

In step 709, the policy server 760 transmits a DSD trigger request message to the ASN-GW 720 through the COPS interface. The DSD trigger request message may include a PRID of the ASN-GW 720. Alternatively, instead of the PRID, the DSD trigger request message may include the MBS_Zone ID, the MS IP (or MAC index), and the old broadcast channel IP.

In step 711, the ASN-GW 720 transmits a DSD request message including a confirmation code to a MAC layer unit 700-2 of the MS 700. In step 713, the MAC layer unit 700-2 transmits a DSD response message including a confirmation code to the ASN-GW 720. Upon receiving the DSD response message, the ASN-GW 720 transmits a DSD trigger response message including a confirmation code to the policy server 760 through the COPS interface in step 715. The ASN-GW 720 determines whether the DSD process has been successfully performed. If the DSD process has failed, the ASN-GW 720 transmits to the MAC layer unit 700-2 a message indicating failure of the DSD process so as to allow the MS to decide to re-try the DSD process or to give up channel modification. Alternatively, a system itself may attempt to re-try the DSD process or perform roll back. The DSD process may be determined a failure when the DSD response message is not received, when a confirmation code for Nack is not included in the DSD response message, or when the generation of the DSD message has failed.

In step 717, the policy server 760 transmits a DSA trigger request message to the ASN-GW 720 through the COPS interface. The DSA trigger request message includes the MBS_Zone ID, the MS IP (or MAC index), the new broadcast channel IP, and the PRID of the ASN-GW 720.

In this case, the ASN-GW 720 extracts an MCID mapped to the new broadcast channel IP from the mapping table. In step 719, the ASN-GW 720 transmits a DSA request message including the extracted MCID to the MAC layer unit 700-2. The DSA request message includes information, which indicates that a service requested to be added is an MCBCS service flow, and also includes the MBS_Zone ID and the extracted MCID. In step 721, the MAC layer unit 700-2 transmits a DSA response message including a confirmation code to the ASN-GW 720.

Upon receiving the DSA response message, the ASN-GW 720 transmits a DSA trigger response message including a confirmation code to the policy server 760 through the COPS interface in step 723. In step 725, the ASN-GW 720 transmits a DSA Ack message including a confirmation code to the MAC layer unit 700-2. In this case, the ASN-GW 720 determines whether the DSA process has been successfully performed. If the DSA process has failed, the ASN-GW 720 transmits a re-connection request message or a system error alert message to the MAC layer unit 700-2, and thus the MAC layer unit 200-2 can re-select a channel. The DSA process may be determined a failure when the DSA response message is not received, when a confirmation code for Nack is not included in the DSA response message, or when the generation of the DSA message fails.

In step 727, the policy server 760 transmits through the SOAP interface a channel change response message including information indicating a success or failure of the channel selection request to the MCBCS server 730. In step 729, the MCBCS server 730 transmits the channel change response message to the MCBCS client 700-1. In step 731, the BS 710 transmits the MCBCS content traffic to the MCBCS client 700-1.

Figure 8:
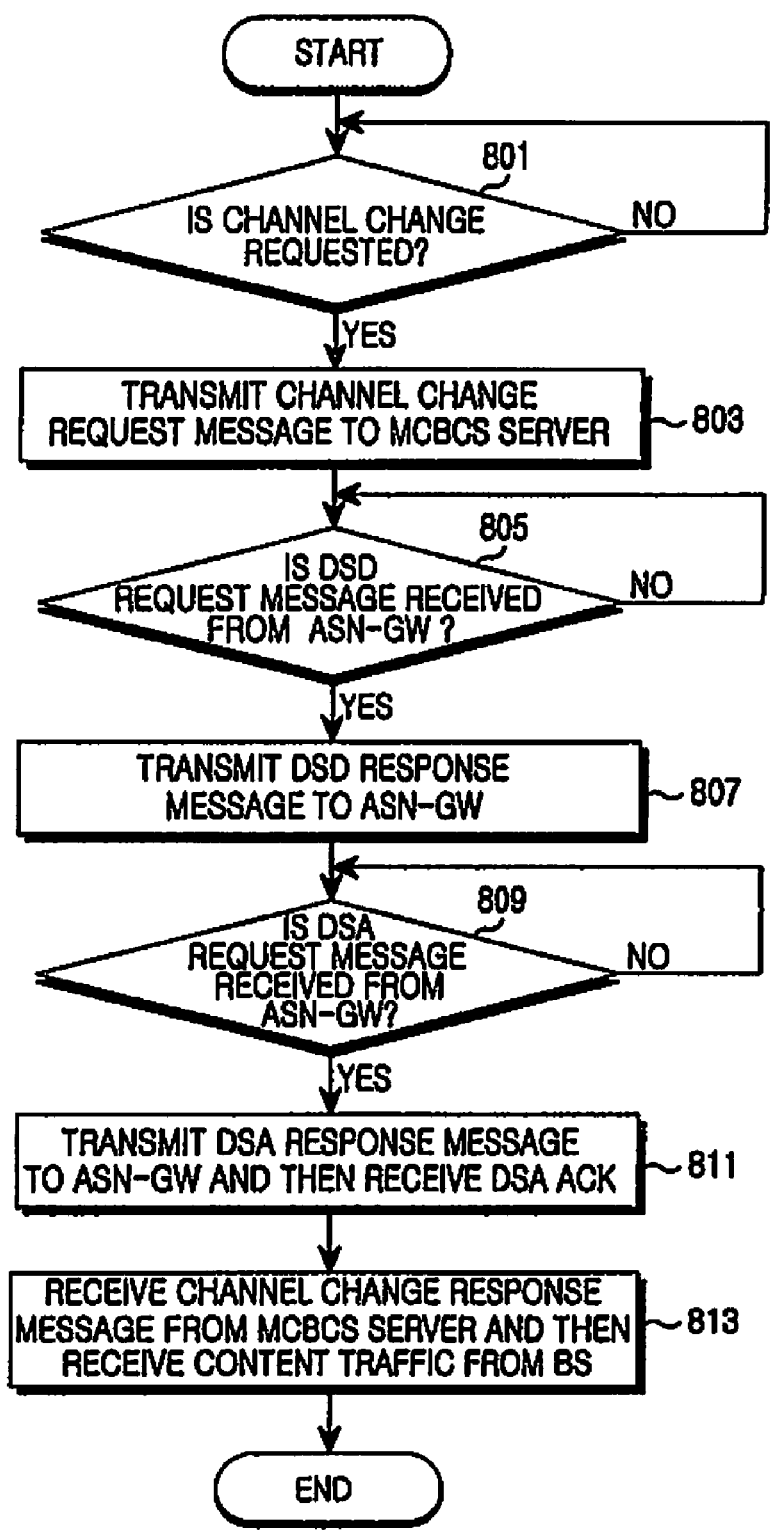
FIG. 8 is a flowchart illustrating a method of changing an MCBCS channel by an MS in a BWA system according to the present invention.

FIG. 8 is a flowchart illustrating a method of changing an MCBCS channel by an MS in a BWA system according to the present invention.

Referring to FIG. 8, the MS 700 determines whether there is a request for changing a channel by key manipulation of a user in step 801, in order to change an old channel currently receiving a service to a new channel. The user of the MS 700 may request to change the channel currently receiving the service by using an MCBCS broadcast schedule list previously received from the MCBCS server 730. Upon receiving the request for changing the channel currently receiving the service, the MS 700 transmits, to the MCBCS server 730, a channel change request message for changing the old channel to the new channel in step 803. The channel change request message includes a BS ID, an MS IP (or MAC index), an old broadcast channel IP, and a new broadcast channel IP.

In step 805, the MS 700 determines whether a DSD request message including a conformation code is received from the ASN-GW 720. Upon receiving the DSD request message, the MS 700 transmits a DSD response message including a confirmation code to the ASN-GW 720 in step 807.

In step 809, the MS 700 determines whether a DSA request message including an MCID for the new channel is received from the ASN-GW 720. The DSA request message includes information, which indicates that a service requested to be added is an MCBCS service flow, and also includes an MBS_Zone ID and the MCID. Upon receiving the DSA request message, the MS 700 transmits a DSA response message including a confirmation code to the ASN-GW 720, and then receives a DSA Ack message including a confirmation code from the ASN-GW 720 in step 811.

In step 813, the MS 700 receives information indicating a success or failure of the channel change request from the MCBCS server 730, and then receives an MCBCS content traffic from the BS. Then, the procedure of FIG. 8 ends.

When the MCBCS channel of the MS 700 is changed by the ASN-GW 720 in the BWA system of the present invention, the same method of FIG. 4 is used. The only difference lies in that, a broadcast channel IP included in a DSA trigger request message is a new broadcast channel IP, and a broadcast channel IP included in a DSD trigger request message is an old broadcast channel IP. The method of changing the MCBCS channel of the MS may be carried out by performing a DSA process and a DSD process, in the above-described order or reverse order. In addition, the MCBCS channel of the MS may change by integrating the DSA process and the DSD process.

Figure 9:
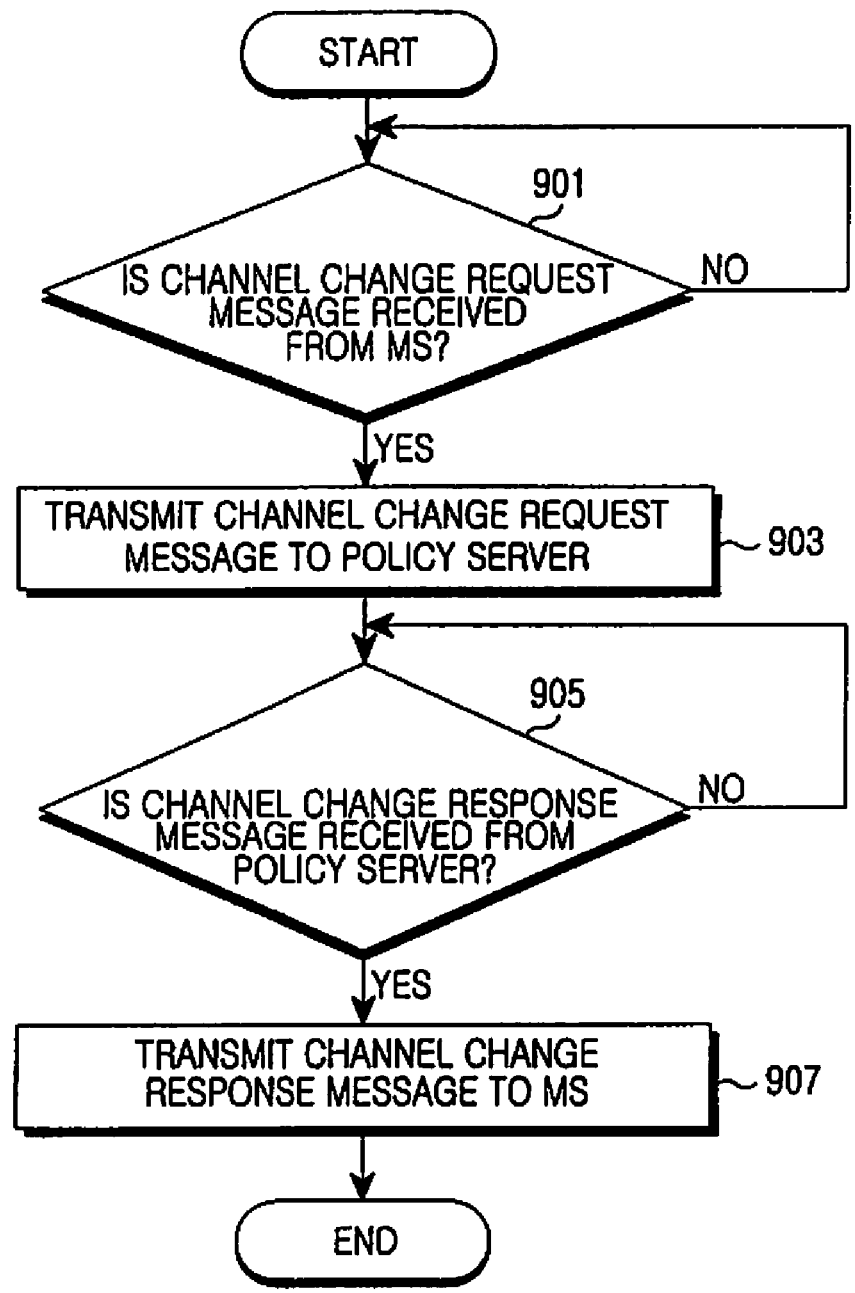
FIG. 9 is a flowchart illustrating a method of changing an MCBCS channel of an MS by an MCBCS server in a BWA system according to the present invention.

FIG. 9 is a flowchart illustrating a method of changing an MCBCS channel of an MS by an MCBCS server in a BWA system according to the present invention.

Referring to FIG. 9, the MCBCS server 730 determines whether a channel change request message for changing an old channel to a new channel is received from the MS 700 in step 901. The channel change request message includes a BS ID, an MS IP (or MAC index), an old broadcast channel IP, and a new broadcast channel IP. Upon receiving the channel change request message, the MCBCS server 730 extracts an MBS_Zone ID, which is mapped to the BS ID and the old broadcast channel IP, from a mapping table. In step 903, the MCBCS server 730 generates a new channel change request message including the extracted MBS_Zone ID, and then transmits the new channel change request message to the policy server 760 through the SOAP interface. The new channel change request message includes the extracted MBS_Zone ID, the MS IP (or MAC index), the old broadcast channel IP, and the new broadcast channel IP.

In step 905, the MCBCS server 730 determines whether a channel change response message including information indicating a success or failure of the channel change request is received from the policy server 760 through the SOAP interface. Upon receiving the channel change response message, the MCBCS server 730 transmits a channel change response message to the MS 700 in step 907. Then, the procedure of FIG. 9 ends.

Figure 10:
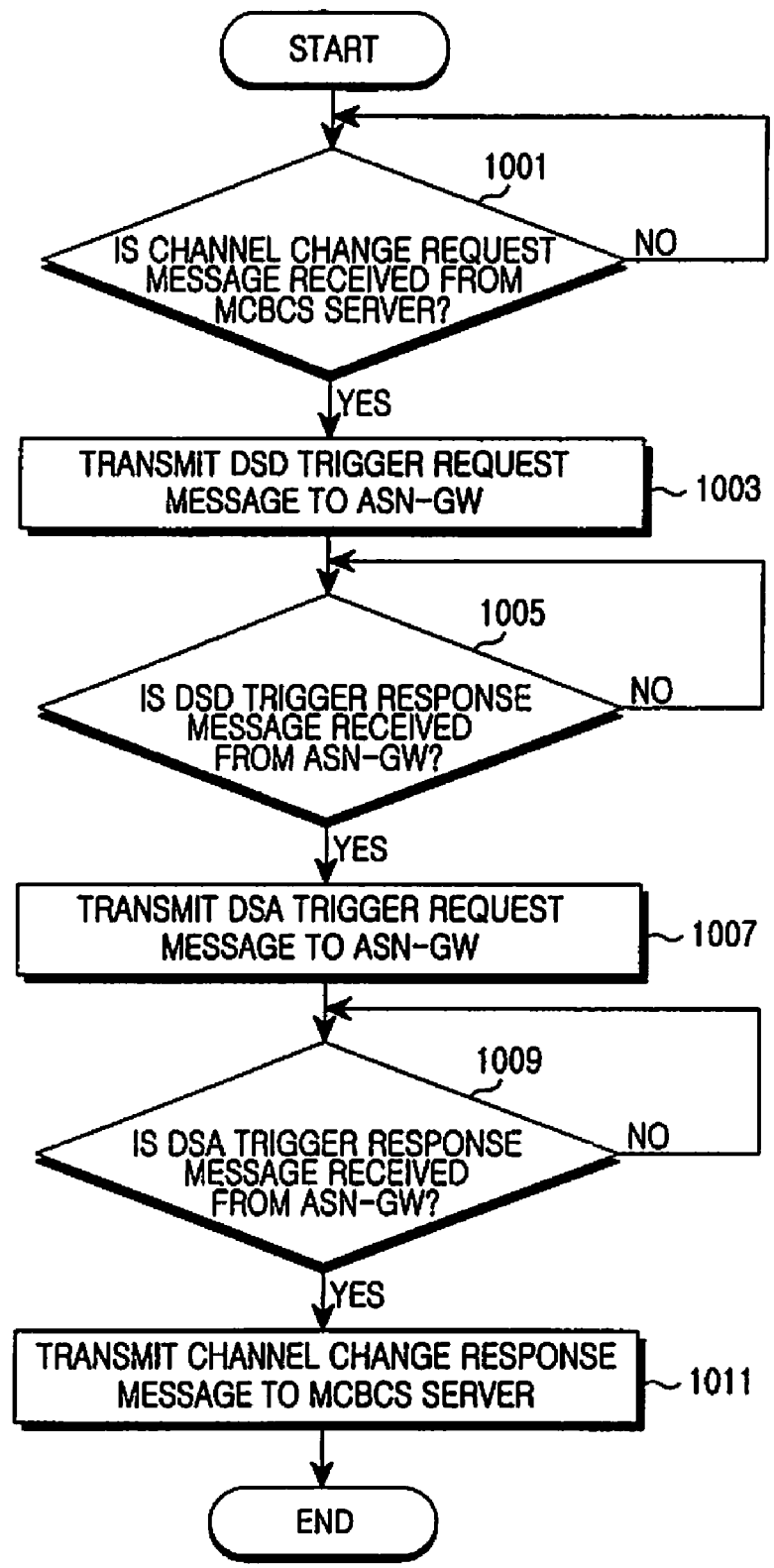
FIG. 10 is a flowchart illustrating a method of changing an MCBCS channel of an MS by a policy server in a BWA system according to the present invention.

FIG. 10 is a flowchart illustrating a method of changing an MCBCS channel of an MS by a policy server in a BWA system according to the present invention.

Referring to FIG. 10, the policy server 760 determines whether a channel change request message is received from the MCBCS server 730 through the SOAP interface in step 1001, in order to change an old channel of the MS 700 to a new channel. The channel change request message includes an MBS_Zone ID, an MS IP (or MAC index), an old broadcast channel IP, and a new broadcast channel IP. Upon receiving the channel change request message, the policy server 760 transmits a DSD trigger request message including the old broadcast channel IP to the ASN-GW 720 through the COPS interface in step 1003. The DSD trigger request message may include a PRID of the ASN-GW 720. Alternatively, instead of the PRID, the DSD trigger request message may include the MBS_Zone ID, the MS IP (or MAC index), and the old broadcast channel IP.

In step 1005, the policy server 760 determines whether a DSD trigger response message including a confirmation code is received from the ASN-GW 720. Upon receiving the DSD trigger response message, the policy server 760 transmits a DSA trigger request message including the new broadcast channel IP to the ASN-GW 720 through the COPS interface in step 1007. The DSA trigger request message includes the MBS_Zone ID, the MS IP (or MAC index), the new broadcast channel IP, and the PRID of the ASN-GW 720.

In step 1009, the policy server 760 determines whether a DSA trigger response message including a confirmation code is received from the ASN-GW 720 through the COPS interface. Upon receiving the DSA trigger response message, the policy server 760 transmits, to the MCBCS server 730, a channel change response message including information indicating a success or failure of the channel change request in step 1011. Then, the procedure of FIG. 19 ends.

As described in FIGS. 7 through 10, the MCBCS channel of the MS changes by performing the DSD process and the DSA process, in the above order. However, the present invention is not limited thereto, and thus the DSD process and the DSA process may be performed in the reverse order. Further, the MCBCS channel of the MS may change by integrating the DSA process and the DSD process.

According to an embodiment of the present invention, an ASN-GW manages a mapping table, and maps an MCID to a broadcast channel IP received from a policy server. However, in another embodiment of the present invention, an MCBCS server for managing the mapping table, in which an MBS_Zone ID is mapped to a BS ID and a broadcast channel IP, may also manage an MCID mapping table for the broadcast channel IP. In this case, upon receiving a channel selection request message or a channel change request message from an MS, the MCBCS server may extract a broadcast channel IP included in a corresponding message or an MCID corresponding to a new broadcast channel IP, generate a new channel selection request message (or a channel change request message) including the extracted MCID, and transmit the generated message to the policy server. Thereafter, the policy server transmits, to the ASN-GW, a DSA trigger request message including the MCID instead of the broadcast channel IP or the new broadcast channel IP. Therefore, there is an advantage in that the ASN-GW does not have to manage the mapping table.

According to the embodiment of the present invention, request and response messages are transmitted and received through the SOAP interface or the COPS interface. However, this is only for purposes of example. Thus, any other compatible protocol may also be used.

In addition, according to the embodiment of the present invention, functions of the policy server may be performed by the MCBCS server instead of the policy server. The MCBCS server and the policy server may be collectively referred to as a Core Service Network (CSN). The CSN may be provided by an Access Service Provider (SAP, e.g., Korea Telecom (KT), Sprint, etc.), or may be utilized by a Broadcast Service Provider (BSP) by leasing a network. Examples of the BSP include an IPTV service provider and a broadcasting station (e.g., Korea Broadcasting System (KBS), Munhwa Broadcasting Corporation (MBC), etc.).

In addition, according to the embodiment of the present invention, the MCID is a MAC layer name tag for the MCBCS. An example of another MAC layer name tag is a Logical Channel ID (LCID). Therefore, instead of the MCID, the LCID or a mapping table of MCID:LCID=1:N may be used. In the embodiment of the present invention, the MAC index is an example of a device ID, the MS IP is an example of a user ID, and the broadcast channel IP is an example of a broadcast channel ID. Examples of another broadcast channel ID include a content ID and a broadcast channel ID.

In addition, according to the embodiment of the present invention, the MCBCS server interacts with the policy server to select or change a channel. In this case, before interacting with the policy server, the MCBCS server interacts with the security server to perform authentication. Thus, the MCBCS server interacts with the policy server when an authorized MS (or user) is used for a broadcast channel to which channel selection or channel change is requested. Otherwise, if an unauthorized MS (or user) is used, the MCBCS server does not interact with the policy server, and instead may transmit a response message to the MS through an application layer. Examples of the response message are "unauthorized channel" or "unauthorized user."

Alternatively, instead of interacting with the security server whenever channel selection or channel change is requested, the MCBCS server may periodically interact with the security server and have a channel configuration table which is permitted according to a user class. In this case, interaction delay is advantageously reduced since the MCBCS server does not have to interact with the security server whenever the channel subscription or the channel change is requested.

In addition, according the embodiment of the present invention, all DSA processes are requested to the MS by the ASN-GW for example. However, the MS may request the DSA processes to the ASN-GW, i.e., when the MS requests the channel selection or the channel change to the MCBCS server through the application layer, the MCBCS server interacts with the security server to perform an MCBCS service authentication process (alternatively, the MCBCS server may manage authentication information by periodically interacting with the security server in advance, and in this case, the MCBCS server does not have to interact with the security server when the channel selection or the channel change is requested). If the MS is an authorized MS, or if the channel is authorized to the MS, the MCBCS server transmits unique authentication information of the MS (or user) to the MS through the application layer.

The MS transmits the authentication information to a MAC layer in the MS. The MAC layer transmits a DSA request message to the ASN-GW, wherein the DSA request message includes the authentication information and a name tag (e.g., broadcast contents/channel ID or broadcast contents/channel IP) of an upper layer for the selected channel. The ASN-GW is assumed to receive the authentication information on broadcast whenever the channel selection or the channel change is periodically requested in advance from the security server or is requested by the MS to the MCBCS server.

Thereafter, upon receiving the DSA request message, if the MS is permitted to use the channel, the ASN-GW transmits, to the MS, a DSA response message including a MAC layer name tag for the channel or contents. Thereafter, when the DSA response message is successfully received, the MS may transmit a DSA Ack message to the ASN-GW, and transmit to the MCBCS server a response message for the channel selection or the channel change through the application layer.

Now, one example of the aforementioned method will be described. When an MS transmits a channel selection request message or a channel change request message to an MCBCS server through an application layer, the MCBCS server interacts with a security server to perform an MCBCS service authentication process. If the MS is an authorized MS or if a broadcast channel in use is authorized to the MS, a response message is transmitted to the MS. The response message includes an MCBCS General Traffic Encryption Key (GTEK) for encrypting/decrypting contents, an MCBCS root key for encrypting/decrypting the MCBCS GTEK, and a random seed value which is unique to the MS and which allows the MCBCS Key Encryption Key (KEK) to be internally generated by the MS. The response message may include only the MCBCS GTEK.

The MS generates the MCBCS root key and the MCBCS KEK by using the random seed value, encrypts the MCBCS GTEK by using the generated MCBCS root key and MCBCS KEK, and then transmits a DSA request message including the encrypted MCBCS GTEK to an ASN-GW.

It is assumed herein that the ASN-GW receives both the MCBCS GTEK and the random seed value or receives only the MCBCS GTEK whenever the channel selection request message or the channel change request message is periodically transmitted in advance from the security server or is transmitted by the MS to the MCBCS server, and the ASN-GW generates the MCBCS root key and the MCBCS KEK by using the random seed value.

Upon receiving the DSA request message, the ASN-GW decrypts the encrypted MCBCS GTEK by using the generated MCBCS rook key and MCBCS KEK, and transmits, to the MS, a DSA response message including a MAC layer name tag corresponding to the decrypted MCBCS GTEK.

Thereafter, when the DSA response message is successfully received, the MS transmits a DSA Ack message to the ASN-GW, and transmits, to the MCBCS server, a response message for the channel selection or the channel change through the application layer.

According to the embodiment of the present invention, all DSD processes are requested to the MS by the ASN-GW for example. However, similar to the aforementioned DSA processes, the DSD processes may be requested to the ASN-GW by the MS, i.e., similar to the DSA process, the MS may request channel release to the MCBCS server through the application layer. Then, upon receiving a response from the MCBCS server, the MS may transmit to the ASN-GW a DSD request message including a MAC layer name tag for the broadcast channel. In this case, when the DSD request message is successfully received, the ASN-GW transmits the DSD response message to the MS. When the DSD response message is successfully received, the MS transmits a DSD Ask message to the ASN-GW, and transmits a response message for channel release to the MCBCS server through the application layer. Alternatively, in a state that the MS does not interact with the MCBCS server, an application layer of the MS may internally transmit a DSD request message, which includes the MAC layer name tag for the broadcast channel, to the ASN-GW through a MAC layer of the MS. Then, when the DSD request message is successfully received, the ASN-GW may transmit the DSD response message to the MS.

If a broadcast selection process (including both application layer interaction and DSA process interaction or including only application layer interaction) of the present invention is successfully completed, the system starts to count a usage start time and a usage time (or packet size) for a channel requested by the MS. When a broadcast release process (including both application layer interaction and DSD process interaction or including only application layer interaction) is completed, the system may terminate the counting operation on the channel, and transmit information on the usage start time and the counted usage time (or packet size), the channel ID (or count ID), the BS ID, and the MS ID to a CSN (e.g., security server or policy server).

Alternatively, when a broadcast selection process (including both application layer interaction and DSA process interaction or including only application layer interaction) is successfully completed, the MS internally starts to count a usage start time and a usage time (or packet size) for a channel requested by the MS. When a broadcast release process (including both application layer interaction and DSD process interaction or including only application layer interaction) is successfully completed, the MS terminates the counting operation on the channel. Thereafter, when a response message is transmitted to the MCBCS server through the application layer in response to the channel release request, the MS transmits the information to the CSN (e.g., security server or policy server).

Still alternatively, when a broadcast selection process is successfully completed, a CSN (e.g., MCBCS server or security server) starts to count a usage start time and a usage time (or packet size) for a requested channel, and when a broadcast release process is completed, the CNS terminates the counting operation on the channel. In this manner, it is possible to store statistic information regarding all broadcast channels for respective MSs or users. The information may be used to perform an accounting operation or may be utilized to obtain statistical data on audiences with respect to all regions and broadcast channels.

According to another embodiment of the present invention, the DSD process may not be carried out when a channel change process is performed i.e., when interaction between a policy server and an ASN-GW is successfully terminated in the channel change process, a PRID for identifying a broadcast channel call between the two Network Entities (NEs) may not be generated, and both the two NEs may not manage broadcast call resources for an MS. This is not applicable when a system transmits count information in the aforementioned example of transmitting count information, and is applicable only when the count information is transmitted by the MS. In other words, when a broadcast call is internally disconnected, the MS terminates a counting operation on the channel, generates a new unicast flow, and transmits corresponding count information to a CSN (e.g., security server or policy server) through an application layer.

All exemplary embodiments of the present invention include, not only an interaction process through an application layer between the MS and the MCBCS server, but also an interaction process (i.e., DSA or DSD process) through a MAC layer. However, only the interaction process through the application layer may be used without the interaction process through the MAC layer, that is, the DSA process and the DSD process. In the DSA process, a MAC layer name tag to be delivered to the MS is delivered when the MCBCS server responses through the application layer. The aforementioned authentication, accounting, and statistic gathering processes are applied without alteration. However, in this case, a policy server is not needed.

According to described embodiments of the present invention, a message including a broadcast channel IP is transmitted when there is a request for channel selection, channel change, or channel release for example. However, a content ID (i.e., application layer name tag) may also be used instead of the broadcast channel IP.

In all broadcast call operation processes according to the embodiment of the present invention, the MCBCS server may also function as the policy server. In other words, when the MCBCS server receives a channel selection request message, a channel change request message, or a channel release request message from the MS, a DSA or DSD trigger request may be directly asked to the ASN-GW.

According to the embodiment of the present invention, when the MS requests the channel selection, the channel change, or the channel release, the MCBCS server may check if a specific channel is authorized to the user. For example, when a channel selection request message, a channel change request message, or a channel release request message is received from the MS, the MCBCS server interacts with the security server to check authentication, and then transmits, to the policy server, the channel selection request message, the channel change request message, or the channel release request message. Alternatively, when the channel change request message or the channel release request message is received from the MS, the MCBCS server transmits, to the policy server, the channel change request message or the channel release request message. Thereafter, the policy server receives the message, and then interacts with the policy server to check authentication. Still alternatively, while MCBCS server or the policy server periodically interacts with the security server to manage a channel list allowed for each user, authentication is checked upon receiving the channel change request message or the channel release request message.

According to the embodiment of the present invention, upon receiving the channel selection request message, the channel release request message, or the channel change request message from the MS, the MCBCS server may change a broadcast channel IP included in the message to an MCID (or LCID) mapped to the broadcast channel IP, and then perform a next step. The MCID is composed of 12 bits, which is small in size. Therefore, overhead can be reduced when interaction is made with the policy server or the ASN-GW. Alternatively, instead of the MCID (or LCID), the broadcast channel IP may change to another name tag defined between the MCBCS server and the policy server or between the MCBCS server and the ASN-GW, followed by a next step. In this case, when the name tag is delivered to the ASN-GW, the ASN-GW may extract an MCID (or LCID) corresponding to the name tag, and then perform a DSA process.

According to the embodiment of the present invention, when a DSA trigger request message is received, the ASN- GW extracts only an MCID mapped to a broadcast channel IP, which is selected by an MS in a channel selection process or a channel change process, and performs a DSA process with respect to the MS by using the extracted MCID. However, connection may be established by performing the DSA process with respect to the MS not only for the MCID mapped to the broadcast channel IP, which is selected by the MS in the channel subscription process or the channel change process, but also for all broadcast channels within an MBS_Zone where the MS belong. For example, upon receiving the DSA trigger request message, the ASN-GW may extract the MCID mapped to the all broadcast channel IPs within the MBS_Zone where the MS belongs, and then perform, for each MCID, the DSA process with respect to the MS. In this case, the MAC layer of the MS receives data through all channels, then decodes the received data, and then passes the data up to the IP layer. The application layer of the MS reports information on a channel, which is selected by the MS for the channel selection or the channel change, to the IP layer. Thus, the IP layer can pass data up to the application layer. The application layer may directly display the data.

For another example, one MCID may be mapped to one MBS_Zone, and a plurality of LCIDs may be mapped to one MCID. In this case, an MS transmits a channel selection request message or a channel change request message, which includes an LCID instead of a broadcast channel IP. Thereafter, by using the MCID mapped to an MBS_Zone where the MS belongs, a DSA process is performed with an ASN-GW. In other words, the ASN-GW extracts the MCID mapped to the MBS_Zone where the MS belongs from a mapping table, and performs the DSA process with the MS by using the extracted MCID. In this case, a MAC layer of the MS receives data for all LCIDs through one connection established by performing the DSA process, and then passes the received data up to an IP layer by performing decoding. An application layer of the MS reports information on the LCID, which is selected by the MS for the channel selection or the channel selection, to the IP layer, so that the IP layer can pass the data up to the application layer. The application layer may directly display the data.

The present invention provides a BS_init DSx interaction process as a high level concept. However, the present invention may also apply to an MS_init DSx interaction process. The MS_init DSx interaction process may be utilized in the following ways. An application layer of an MS performs the MS_init DSx process by triggering a MAC layer of the MS. Then, an ASN-GW interacts with a security server to perform an authentication process. If a policy server also manages all service flow processes of the ASN-GW, the ASN-GW communicates with the policy server instead of the security server by using an MS ID and a service flow ID. When an interaction process with a required CSN (e.g., security server or policy server) is completed, the ASN-GW combines a MAC layer name tag (MCID or LCID) with a DSA response message and a DSD response message, and then transmits the resultant messages to the MS. In the case of the DSD response message, only a confirmation code may be added before being transmitted to the MS. When an upper layer name tag and the MAC layer name tag are managed by the ASN-GW, these name tags may be delivered when the ASN-GW performs a mapping operation.

Meanwhile, in a case where a broadcast provider provides a service by leasing a network of a mobile communication provider, the broadcast provider may own a security server & a Subscription Profile Repository (SPR). In the highest level concept, an MCBCS server managed by the mobile communication provider manages a direct interface with an ASN-GW. Herein, a content provider, a service guide provider, and a security server & SPR are managed by each broadcast provider unlike a CSN (e.g., security server and policy server) & ASN (e.g., ASN-GW and BS) which are managed by a mobile communication provider. Therefore, as for the content provider, the service guide provider, and the security server & SPR, the MCBCS server manages an intermediate interface instead of the direction interface. The MCBCS server manages MBS_Zone establishment and MCID allocation, and reports mapping information to the ASN-GW. In order to identify the broadcast provider, a broadcast ID may be included in each interaction message. For example, the broadcast provider NE cannot directly be involved in BS_init DSx triggering which can be performed only by the MCBCS server. When the MS requests generation, modification, and release of a broadcast channel through an application layer, if the MCBCS server is a first entity that receives the request, the MCBCS server interacts with the broadcast provider to perform authentication, receives necessary information, and delivers the information to the MS through the ASN. For another example, when each broadcast provider has an independent authentication server, if the independent authentication server needs to interact with an NE existing in an area of the mobile communication provider, interaction is performed through use of the MCBCS server. For still another example, since there is no way for each broadcast provider to know information on the ASN, internal resources of the ASN (e.g., MBS_Zone establishment or MCID allocation) can be established by using only the MCBCS server, i.e., each broadcast provider transmits information on a service area or a broadcast channel schedule list to the MCBCS server, and the MCBCS server consistently manages the MBS_Zone establishment and the MCID mapping as described above.

According to the present invention, an apparatus and method for selecting, releasing, and changing a MCBCS channel of an MS in a BWA system are provided. Thus, information can be delivered between interfaces with minimum and simple operations while an existing unicast interface is utilized without alteration. As a result, there is an advantage in that overall transmission delay is reduced for an MCBCS call process, and a processing capacity can be effectively utilized.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of selecting a MultiCast and BroadCast Service (MCBCS) channel by a Mobile Station (MS) in a Broadband Wireless Access (BWA) system, the method comprising:

upon receiving a request to select a specific channel, transmitting a channel selection request message for selecting the specific channel;

determining whether a Dynamic Service Addition (DSA) request message including a Media Access Control (MAC) layer name tag for the specific channel is received from an Access Service Network-Gateway (ASN-GW), and, upon receiving the DSA request message, transmitting a DSA response message to the ASN-GW; and receiving a channel selection response message including information indicating a success or failure of the channel selection from an MCBCS server.

2. The method of claim 1, wherein the channel selection request message includes at least one of a Base Station (BS) IDentifier (ID), a user ID, a device ID, and a broadcast channel ID.

3. The method of claim 1, wherein the DSA request message includes at least one of information, which indicates that a service requested to be added is an MCBCS service flow, a Multicast and Broadcast Service_Zone (MBS_Zone) ID, and the MAC layer name tag.

4. The method of claim 1, wherein the MAC layer name tag is one of a Multicast Connection ID (MCID), a Logical Channel ID (LCD), and a mapping table of MCID:LCID=1:N.

5. The method of claim 1, further comprising:
upon receiving a request for channel release, transmitting to the MCBCS server a channel release request message for releasing the specific channel;
determining whether a Dynamic Service Deletion (DSD) request message is received from the ASN-GW, and, upon receiving the DSD request message, transmitting a DSD response message to the ASN-GW; and
receiving a channel release response message including information indicating a success or failure of the channel release from the MCBCS server.

6. The method of claim 5, wherein the channel release request message includes at least one of a BS ID, a user ID, a device ID, and a broadcast channel ID.

7. The method of claim 1, further comprising:
upon receiving a request for changing an old channel to a new channel, transmitting a channel change request message for changing the old channel to the MCBCS server;
determining whether a Dynamic Service Deletion (DSD) request message is received from the ASN-GW, and, upon receiving the DSD request message, transmitting a DSD response message to the ASN-GW;
determining whether a DSA request message including a MAC layer name tag for the new channel is received from the ASN-GW, and, upon receiving the DSA request message, transmitting a DSA response message to the ASN-GW; and
receiving a channel change response message including information indicating a success or failure of the channel change request from the MCBCS server.

8. The method of claim 7, wherein the channel change request message includes at least one of a BS ID, a user ID, a device ID, an old broadcast channel ID, and a new broadcast channel ID.

9. The method of claim 7, wherein a DSD process and a DSA process for changing the channel are performed by integrating or in a reverse order.

10. A method of selecting a MultiCast and BroadCast Service (MCBCS) channel of a Mobile Station (MS) by an Access Service Network-Gateway (ASN-GW) in a Broadband Wireless Access (BWA) system, the method comprising:
upon receiving a Dynamic Service Addition (DSA) trigger request message including a broadcast channel IDentifier (ID) of the MS from a policy server, extracting a Media Access Control (MAC) layer name tag mapped to the broadcast channel ID from a mapping table;
transmitting a DSA request message including the extracted MAC layer name tag to the MS; and
upon receiving a DSA response message from the MS, transmitting a DSA trigger response message to the policy server.

11. The method of claim 10, wherein the DSA trigger request message includes at least one of a Multicast and Broadcast Service_Zone (MBS_Zone) ID, a user ID, a device ID, the broadcast channel ID, and a PRovisioning instance IDentifier (PRID).

12. The method of claim 10, wherein the DSA request message includes at least one of information, which indicates that a service requested to be added is an MCBCS service flow, an MBS_Zone ID, and the MAC layer name tag.

13. The method of claim 10, wherein the MAC layer name tag is one of a Multicast Connection ID (MCID), a Logical Channel ID (LCID), and a mapping table of MCID:LCID=1:N.

14. The method of claim 10, further comprising:
upon receiving a Dynamic Service Deletion (DSD) trigger request message from the policy server, transmitting a DSD request message to the MS; and
upon receiving a DSD response message from the MS, transmitting a DSD trigger response message to the policy server.

15. The method of claim 14, wherein the DSD trigger request message includes at least one of an MBS_Zone ID, a user ID, a device ID, the broadcast channel ID, and a PRID.

16. The method of claim 10, further comprising:
upon receiving a DSD trigger request message including an old broadcast channel ID of the MS from the policy server, transmitting a DSD request message to the MS, in order to change the MCBCS channel to a new channel, and
upon receiving a DSD response message from the MS, transmitting a DSD trigger response message to the policy server;
upon receiving a DSA trigger request message including a new broadcast channel ID of the MS from the policy server, extracting a MAC layer name tag mapped to the new broadcast channel ID from the mapping table;
transmitting a DSA request message including the extracted MAC layer name tag mapped to the new broadcast channel ID to the MS; and
upon receiving a DSA response message from the MS, transmitting a DSA trigger response message to the policy server.

17. The method of claim 16, wherein the DSD trigger request message includes at least one of an MBS_Zone ID, a user ID, a device ID, an old broadcast channel ID, and a PRID.

18. The method of claim 16, wherein a DSD process and a DSA process for changing the channel are performed by integrating or in a reverse order.

19. A method of selecting a MultiCast and BroadCast Service (MCBCS) channel of a Mobile Station (MS) by an MCBCS server in a Broadband Wireless Access (BWA) system, the method comprising:
upon receiving a channel selection request message for selecting a specific channel from the MS, extracting a Multicast and Broadcast Service_Zone (MBS_Zone) IDentifier (ID), which is mapped to a Base Station (BS) ID and a broadcast channel ID included in the selection request message, by searching a mapping table;
generating a new channel selection request message including the extracted MBS_Zone ID and transmitting the new channel selection request message to a policy server; and
upon receiving a channel selection response message including information indicating a success or failure of the channel selection request from the policy server, transmitting the channel selection response message to the MS.

20. The method of claim 19, wherein the channel selection request message includes at least one of the BS ID, a user ID, a device ID, and the broadcast channel ID.

21. The method of claim 19, wherein the new channel selection request message includes at least one of the extracted MBS_Zone ID, a user ID, a device ID, and the broadcast channel ID.

22. The method of claim 19, further comprising, upon receiving the channel selection request message from the MS, performing authentication by interacting with the policy server.

23. The method of claim 19, further comprising periodically performing authentication by interacting with the policy server in advance.

24. The method of claim 19, further comprising:
upon receiving a channel release request message for releasing the MCBCS channel from the MS, extracting the MBS_Zone ID, which is mapped to the BS ID and the broadcast channel ID included in the channel release request message, by searching the mapping table;
generating a new channel release request message including the extracted MBS_Zone ID and transmitting the new channel selection request message to the policy server; and
upon receiving a channel release response message including information indicating a success or failure of the channel release request from the policy server, transmitting the channel release response message to the MS.

25. The method of claim 24, wherein the channel release request message includes at least one of the BS ID, a user ID, a device ID, and a broadcast channel ID.

26. The method of claim 24, wherein the new channel release request message includes at least one of the extracted MBS_Zone ID, the user ID, the device ID, and the broadcast channel ID.

27. The method of claim 19, further comprising:
upon receiving from the MS a channel change request message for changing the MCBCS channel to a new channel, extracting an MBS_Zone ID, which is mapped to the BS ID and an old broadcast channel ID included in the channel change request message, by searching the mapping table;
generating a new channel change request message including the extracted MBS_Zone ID and transmitting the new channel change request message to the policy server; and
upon receiving a channel change response message including information indicating a success or failure of the channel change request from the policy server, transmitting the channel change response message to the MS.

28. The method of claim 27, wherein the channel change request message includes at least one of the BS ID, a user ID, a device ID, the old broadcast channel ID, and a new broadcast channel ID.

29. The method of claim 27, wherein the new channel change request message includes at least the MBS_Zone ID, a user ID, a device ID, the old broadcast channel ID, and a new broadcast channel ID.

30. The method of claim 27, further comprising, upon receiving the channel change request message from the MS, performing authentication by interacting with the policy server.

31. The method of claim 27, further comprising periodically performing authentication by interacting with the policy server in advance.

32. The method of claim 19, further comprising, prior to receiving the channel selection request message from the MS:
upon receiving a service list request message for requesting a broadcast schedule list from the MS, performing authentication by interacting with the policy server; and
transmitting a service list response message including the broadcast schedule list to the MS.

33. A method of selecting a MultiCast and BroadCast Service (MCBCS) channel of a Mobile Station (MS) by a policy server in a Broadband Wireless Access (BWA) system, the method comprising:
upon receiving a channel selection request message for selecting a specific channel from an MCBCS server, transmitting a Dynamic Service Addition (DSA) trigger request message to an Access Service Network-Gateway (ASN-GW); and
upon receiving a DSA trigger response message from the ASN-GW, transmitting a channel selection response message including information indicating a success or failure of the channel selection request to the MCBCS server.

34. The method claim 33, wherein the channel selection request message includes at least one of a Multicast and Broadcast Service_Zone (MBS_Zone) IDentifier (ID), a user ID, a device ID, and a broadcast channel ID.

35. The method claim 33, wherein the DSA trigger request message includes at least one of an MBS_Zone ID, a user ID, a device ID, a broadcast channel ID, and a PRovisioning instance IDentifier (PRID).

36. The method claim 33, further comprising:
upon receiving a channel release request message for the channel from the MCBCS server, transmitting a Dynamic Service Deletion (DSD) trigger request message to the ASN-GW; and
upon receiving a DSD trigger response message from the ASN-GW, transmitting a channel release response message including information indicating a success or failure of the channel release request to the MCBCS server.

37. The method claim 36, wherein the channel release request message includes at least one of an MBS_Zone ID, a user ID, a device ID, and a broadcast channel ID.

38. The method of claim 36, wherein the DSD trigger request message includes at least one of an MBS_Zone ID, a user ID, a device ID, and a broadcast channel ID.

39. The method claim 33, further comprising:
upon receiving from the MCBCS server a channel change request message for changing the MCBCS channel to a new channel, transmitting a Dynamic Service Deletion (DSD) trigger request message including an old broadcast channel ID to the ASN-GW;
upon receiving a DSD trigger response message from the ASN-GW, transmitting a DSA trigger request message including a new broadcast channel ID to the ASN-GW; and
upon receiving a channel change DSA trigger response message from the ASN-GW, transmitting a channel change response message including information indicating a success or failure of the channel change request to the MCBCS server.

40. The method of claim 39, wherein the channel change request message includes at least one of an MBS_Zone ID, a user ID, a device ID, the old broadcast channel ID, and the new broadcast channel ID.

41. The method of claim 39, wherein the DSD trigger request message includes at least one of an MBS_Zone ID, a user ID, a device ID, the old broadcast channel ID, and a PRID.

42. A method of selecting a MultiCast and BroadCast Service (MCBCS) channel of a Mobile Station (MS) in a Broadband Wireless Access (BWA) system, the method comprising:

requesting, by the MS, an MCBCS server to select a specific channel;

requesting, by the MCBCS server, a policy server to select the channel of the MS;

requesting, by the policy server, an Access Service Network-Gateway (ASN-GW) to perform a Dynamic Service Addition (DSA) trigger; and performing, by the ASN-GW, a DSA process with the MS.

43. The method of claim 42, further comprising:

requesting, by the MS, the MCBCS server to release the channel;

requesting, by the MCBCS server, the policy server to release the channel of the MS;

requesting, by the policy server, the ASN-GW to perform a Dynamic Service Deletion (DSD) trigger; and performing, by the ASN-GW, a DSD process with the MS.

44. The method of claim 42, further comprising:

requesting, by the MS, the MCBCS server to change the channel to a new channel;

requesting, by the MCBCS server, the policy server to change the channel of the MS;

requesting, by the policy server, the ASN-GW to perform a DSD trigger together with the DSA trigger for the new channel; and performing, by the ASN-GW, a DSD process and the DSA process with the MS.

45. A method of selecting a MultiCast and BroadCast Service (MCBCS) channel of a Mobile Station (MS) in a Broadband Wireless Access (BWA) system, the method comprising:

upon receiving a request to select a specific channel, transmitting a channel selection request message for selecting the channel to an MCBCS server;

transmitting to an Access Service Network-Gateway (ASN-GW) a Dynamic Service Addition (DSA) request message including unique authentication information of the MS with respect to the channel; and receiving a DSA response message including a MAC layer name tag corresponding to the unique authentication information from the ASN-GW.

46. The method of claim 45, further comprising receiving the unique authentication information from the MCBCS server.

47. The method of claim 45, wherein the MAC layer name tag is one of a Multicast Connection ID (MCID) and a Logical Channel ID (LCID).

48. A method of changing a MultiCast and BroadCast Service (MCBCS) channel by a Mobile Station (MS) in a Broadband Wireless Access (BWA) system, the method comprising:

upon receiving a request to change a specific channel to a new channel, transmitting a channel change request message for changing the specific channel to an MCBCS server;

transmitting to an Access Service Network-Gateway (ASN-GW) a Dynamic Service Deletion (DSD) request message including a Media Access Control (MAC) layer name tag for the specific channel, and receiving a DSD response message from the ASN-GW; and transmitting to the ASN-GW a Dynamic Service Addition (DSA) request message including unique authentication information of the MS with respect to the new channel, and receiving a DSA response message including a MAC layer name tag corresponding to the unique authentication information from the ASN-GW.

49. The method of claim 48, wherein the MAC layer name tags are one of a Multicast Connection ID (MCID) and a Logical Channel ID (LCID).

50. The method of claim 48, further comprising receiving the unique authentication information from the MCBCS server.

51. An apparatus for selecting a MultiCast and BroadCast Service (MCBCS) channel by a Mobile Station (MS) in a Broadband Wireless Access (BWA) system, the apparatus comprising:

the MS for, upon receiving a request to select a specific channel, transmitting to an MCBCS server a channel selection request message for selecting the specific channel;

the MCBCS for, upon receiving the channel selection request message from the MS, extracting a Multicast and Broadcast Service_Zone (MBS_Zone) ID, which is mapped to a Base Station (BS) IDentifier (ID) and a broadcast channel ID included in the selection request message, by searching a mapping table, for generating a new channel selection request message including the extracted MBS_Zone ID, and for transmitting the new channel selection request message to a policy server;

an Access Service Network-Gateway (ASN-GW) for, upon receiving a Dynamic Service Addition (DSA) trigger request message from the policy server, extracting a MAC layer name tag mapped to a broadcast channel ID included in the DSA trigger request message by searching the mapping table, for generating a DSA request message including the extracted MAC layer name tag, and for transmitting the DSA request message to the MS.

52. The apparatus of claim 51, wherein, upon receiving a DSA response message from the MS, the ASN-GW transmits a DSA trigger response message to the policy server.

53. The apparatus of claim 51, wherein, upon receiving a channel selection response message including information indicating a success or failure of the channel selection request from the policy server, the MCBCS server transmits the channel selection response message to the MS.

54. The apparatus of claim 51, wherein the channel selection request message includes at least one of the BS ID, a user ID, a device ID, and the broadcast channel ID.

55. The apparatus of claim 51, wherein the new channel selection request message includes at least one of the extracted MBS_Zone ID, a user ID, a device ID, and the broadcast channel ID.

56. The apparatus of claim 51, wherein the MAC layer name tag is one of a Multicast Connection ID (MCID), a Logical Channel ID (LCID), and a mapping table of MCID: LCID=1:N.

57. The apparatus of claim 51, wherein the DSA trigger request message includes at least one of the MBS_Zone ID, a user ID, device ID, the broadcast channel ID, and a PRovisioning instance IDentifier (PRID).

58. The apparatus of claim 51, wherein the DSA request message includes at least one of information, which indicates that a service requested to be added is an MCBCS service flow, the MBS_Zone ID, and the MAC layer name tag.

59. The apparatus of claim 51, wherein, upon receiving the channel selection request message from the MS, the MCBCS performs authentication by interacting with the policy server.

60. The apparatus of claim 51, wherein the MCBCS server periodically performs authentication by interacting with the policy server in advance.

61. The apparatus of claim 51, wherein
upon receiving a request to release the channel, the MS transmits a channel release request message for releasing the channel to the MCBCS server;
upon receiving the channel release request message from the MS, the MCBCS server extracts the MBS_Zone ID, which is mapped to the BS ID and the broadcast channel ID included in the channel release request message, generates a new channel release request message including the extracted MBS_Zone ID, and transmits the new channel release request message to the policy server; and
upon receiving a Dynamic Service Deletion (DSD) trigger request message from the policy server, the ASN-GW transmits a DSD request message to the MS.

62. The apparatus of claim 61, wherein, upon receiving a DSD response message from the MS, the ASN-GW transmits a DSD trigger response message to the policy server.

63. The apparatus of claim 61, wherein, upon receiving a channel release response message including information indicating a success or failure of the channel release request from the policy server, the MCBCS server transmits the channel release response message to the MS.

64. The apparatus of claim 61, wherein the channel release request message includes at least one of the BS ID, a user ID, a device ID, and the broadcast channel ID.

65. The apparatus of claim 61, wherein the new channel release request message includes at least one of the extracted MBS_Zone ID, the user ID, a device ID, and the broadcast channel ID.

66. The apparatus of claim 61, wherein the DSD trigger request message includes at least one of the MBS_Zone ID, a user ID, a device ID, the broadcast channel ID, and a PRID.

67. The apparatus of claim 51, wherein
upon receiving a request to change the channel to a new channel, the MS transmits a channel change request message including an old broadcast channel ID and a new broadcast channel ID to the MCBCS server;
upon receiving a channel change request message from the MS, the MCBCS server extracts the MBS_Zone ID, which is mapped to the BS ID and the old broadcast channel ID included in the channel change request message, by searching the mapping table, generates a new channel change request message including the extracted MBS_Zone ID, and transmits the new channel change request message to the policy server; and
upon receiving a Dynamic Service Deletion (DSD) trigger request message including the old broadcast channel ID from the policy server, the ASN-GW transmits a DSD request message to the MS, and upon receiving a DSA trigger request message including the new broadcast channel ID from the policy server, the ASN-GW extracts a MAC layer name tag mapped to the new broadcast channel ID from the mapping table, and then transmits a DSA request message including the extracted MAC layer name tag mapped to the new broadcast channel ID to the MS.

68. The apparatus of claim 67, wherein, upon receiving a DSD response message from the MS, the ASN-GW transmits a DSD trigger response message to the policy server, and upon receiving a DSA response message from the MS, the ASN-GW transmits a DSA trigger response message to the policy server.

69. The apparatus of claim 67, wherein, upon receiving a channel change response message including information indicating a success or failure of the channel change request from the policy server, the MCBCS server transmits the channel change response message to the MS.

70. The apparatus of claim 67, wherein the channel change request message includes at least one of the BS ID, a user ID, a device ID, the old broadcast channel ID, and the new broadcast channel ID.

71. The apparatus of claim 67, wherein the new channel change request message includes at least one of the MBS_Zone ID, a user ID, a device ID, the old broadcast channel ID, and the new broadcast channel ID.

72. The apparatus of claim 67, wherein a DSD process and a DSA process for changing the channel are performed by integrating or in a reverse order.

73. The apparatus of claim 67, wherein the DSD trigger request message includes at least one of the MBS_Zone ID, a user ID, a device ID, the broadcast channel ID, and a PRID.

* * * * *